United States Patent [19]
Winski et al.

[11] Patent Number: 5,961,275
[45] Date of Patent: Oct. 5, 1999

[54] PALLETIZER AND PALLETIZING METHODS

[75] Inventors: Ernest P. Winski, Oshkosh; David R. Rastall, Appleton, both of Wis.

[73] Assignee: Goldco Industries, Inc., Loveland, Colo.

[21] Appl. No.: 09/015,893

[22] Filed: Jan. 30, 1998

Related U.S. Application Data

[62] Division of application No. 08/630,508, Apr. 10, 1996, Pat. No. 5,716,189, which is a division of application No. 08/343,216, Nov. 22, 1994, abandoned, which is a division of application No. 08/177,203, Jan. 3, 1994, Pat. No. 5,372,472, which is a continuation of application No. 08/076,272, Jun. 11, 1993, abandoned, which is a continuation of application No. 07/653,302, Feb. 11, 1991, abandoned.

[51] Int. Cl.$^6$ .................................................. B65G 57/22
[52] U.S. Cl. ........................................................ 414/792.6
[58] Field of Search ............................. 414/791.9, 798.9, 414/799, 790.9, 791, 791.6, 792.6; 198/347.1, 357, 358

[56] References Cited

U.S. PATENT DOCUMENTS

| | | |
|---|---|---|
| 3,905,489 | 9/1975 | Berndt et al. . |
| 4,143,752 | 3/1979 | Del Rossa ............................. 198/358 |
| 4,352,616 | 10/1982 | Brenner . |
| 4,898,511 | 2/1990 | Rossig et al. . |
| 5,139,388 | 8/1992 | Myrlea et al. ........................ 414/791.6 |
| 5,437,535 | 8/1995 | Martin ................................. 414/791.6 |
| 5,533,861 | 7/1996 | Klupfel . |
| 5,540,545 | 7/1996 | Leeds et al. ............................. 198/430 |

*Primary Examiner*—David A. Bucci
*Assistant Examiner*—Gregory A Morse
*Attorney, Agent, or Firm*—Robert E. Harris

[57] ABSTRACT

Palletizers and methods of palletizing are disclosed. The palletizers are adapted to receive and arrange units of material and to concurrently fabricate first and second layers therefrom; or to place them in layers at either of first and second delivery support areas; or both. A plurality of layer forming stations can be vertically spaced, horizontally spaced, or both. Plural load forming stations can be horizontally spaced, vertically spaced, or both. Pallets can be sequenced into the load forming stations when empty or partially empty; and can be sequenced out of the load forming stations when empty, partially empty, or full. A given layer may be a hybrid layer comprised of the sum of partial layers fabricated separately. In some embodiments, the transfer apparatus can transfer layers to more than one of more than one load forming stations. In some embodiments, rows of units of material are advanced transversely onto and across an in-feed conveyor to thereby define, on the in-feed conveyor, the full width of the layer being formed.

19 Claims, 12 Drawing Sheets

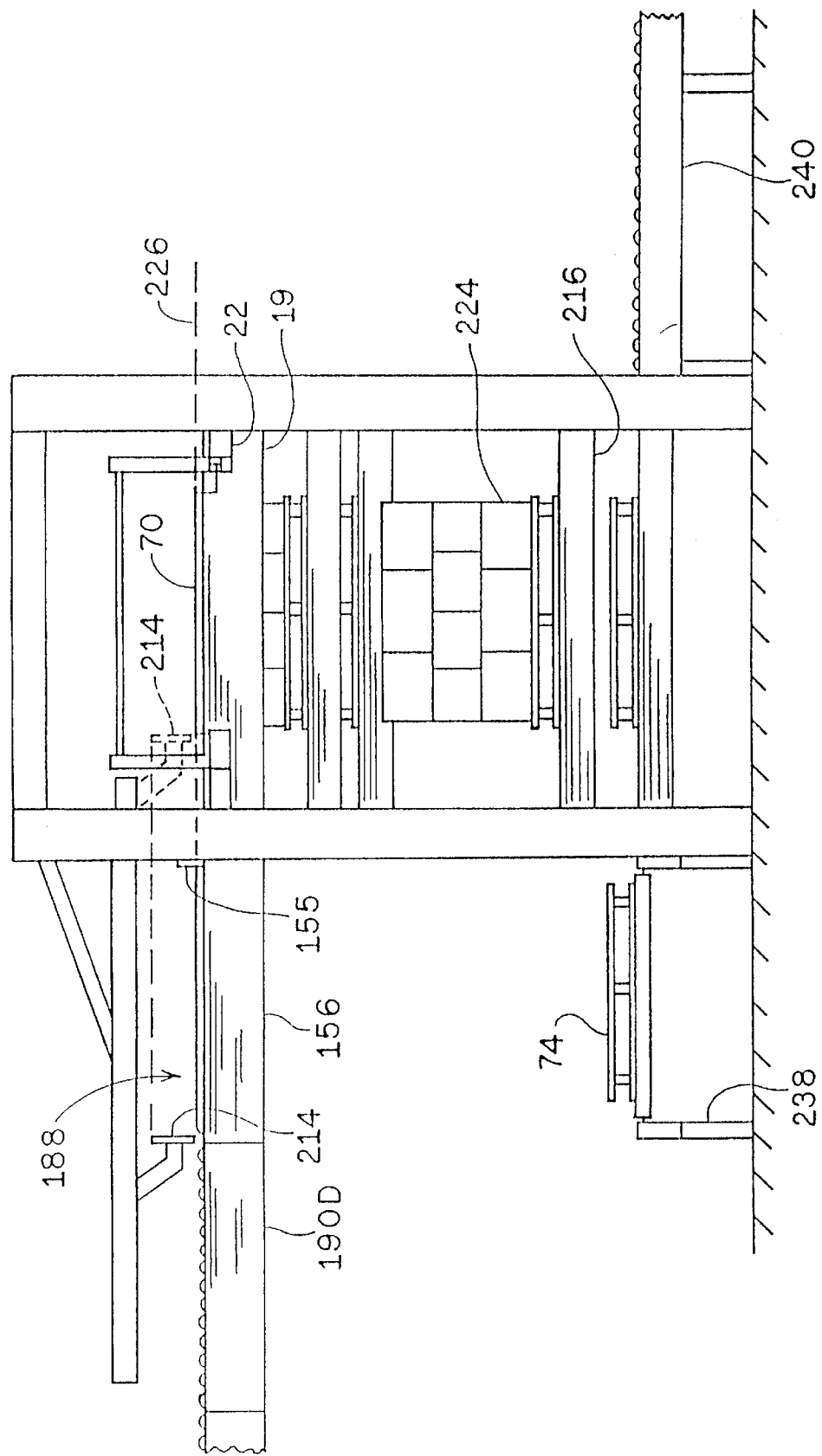

PALLETIZER AND PALLETIZING METHODS

RELATED APPLICATION

This application is a division of U.S. patent application Ser. No. 08/630,508, filed Apr. 10, 1996, now U.S. Pat. No. 5,716,189, which is a division of application Ser. No. 08/343,216, filed Nov. 22, 1994, now abandoned, which is a division of application Ser. No. 08/177,203, filed Jan. 3, 1994, now U.S. Pat. No. 5,372,472, which is a continuation of application Ser. No. 08/076,272, filed Jun. 11, 1993, now abandoned, which is a continuation of application Ser. No. 07/653,302, filed Feb. 11, 1991, now abandoned.

BACKGROUND OF THE INVENTION

This invention relates to palletizing apparatus for palletizing units of goods, such as cartons, cases, stacks of papers, and the like.

The basic principles of palletizing are well known and are generally discussed in my U.S. Pat. No. 4,704,060, herein incorporated by reference in its entirety. As far as is known, though, conventional palletizers are generally limited to receiving goods from only one line (e.g. a production line) at a time, and can deliver layers of the goods received to only one location. While multiple streams of product have been combined ahead of the palletizer, as in U.S. Pat. No. 3,836,018 Dawson, multiple product streams have not been combined in, or otherwise concurrently fed into, a palletizer.

Accordingly, the efficiency of the layer transfer plate may not be optimized as it waits for formation of a layer as an output from a relatively slower production line. One option is to sequentially feed two or more different products along the same conveyor in an effort to more efficiently utilize the transfer plate. This provides opportunity for unwanted mixing of the different materials in that part of the processing operation which is common to being used by both products, and so this option is sometimes not preferred.

While it may be desirable to feed a plurality of production lines into and through a single palletizer, and wherein the production lines potentially produce different products, it is also desirable to minimize the amount of equipment that is commonly traversed by the different products, in order to reduce the potential for unintentional intermingling of the products.

To the extent the palletizing apparatus has the capacity to handle the incoming volume, it is desirable to use one palletizer to concurrently process the output of a plurality of material handling process lines, such as conveyors. This reduces the number of palletizers needed as well as reducing the floor space requirement, labor and maintenance costs, and the like.

Dawson '018 teaches sequential movement of partial pallet loads of units of material to the layer receiving locus. But such repeated moving of significant weights of material in order to bring the proper pallet load into alignment with the in-coming layer requires substantial load bearing equipment, and locomotion equipment, to effect movement of the plurality of partial loads, as well as substantial energy expended through such locomotion equipment to effect such movement.

In light of the above deficiencies in the art, it is one object of this invention to provide palletizers having two or more layer forming stations such that a plurality of layers of material (at least 2 layers) can be formed, namely constructed, simultaneously.

It is a particular object to provide a palletizer wherein the layer forming stations are arranged such that the transfer plate can be positioned at one location to pick up a layer from one of a selection of layer forming stations.

It is another object to provide a palletizer wherein the layer forming stations are spaced vertically with respect to each other thereby minimizing the floor space requirement of the palletizer.

It is still another object to provide a transfer plate, and carriage therefore, which are adapted to delivering layers of material to a plurality of load forming stations. Still another object is to provide apparatus and method for combining partial layers of units of different materials to make a mixed layer, and to place such a mixed layer on a pallet.

A further object is to place a plurality of layers on a load, and wherein the materials in one such layer are different from the materials in another such layer.

Yet another object is to minimize the linear travel path of the transfer plate, thereby increasing its efficiency, by accomplishing vertical movement relative to the load forming station, by vertically moving the respective load forming station.

Still another object is to provide apparatus and methods to form layers of material on the in-feed conveyor by sequentially feeding rows of units of material across the in-feed conveyor and advancing the rows against a stop and against each other.

SUMMARY OF THE DISCLOSURE

Some of the objects are obtained in a first family of palletizing apparatus, the respective apparatus comprising a first layer forming station, a second layer forming station, a load support, means adapted to receive delivery of, and to support, a pallet, and to receive delivery of, and to support, one or more layers of material on the pallet when the pallet is positioned at the load support means whereby loads are formed on the pallets, and a transfer means, the transfer means being adapted to receive material from the first and second layer forming stations and to transfer the material to the load support means.

In some embodiments, the transfer plate is adapted to be disposed in a first location when receiving material thereon from a selected one of the first and second layer forming stations, and is adapted to be moved to a second location when delivering the material to the respective pallet, and wherein material can be received from either of the first and second layer forming stations onto the transfer plate when the transfer plate is in the first location. In these embodiments, the first and second layer forming stations are preferably separated from each other by distance sufficient to accommodate disposition of the transfer plate between major portions of the layer forming stations while the transfer plate is in position at the first location to receive material from either of the first and second layer forming stations.

In some embodiments, the transfer plate is adapted to be positioned in a first location while receiving material thereonto from the first layer forming station; and is adapted to be positioned in a second location, different from the first location, when receiving material thereonto from the second layer forming station. In these embodiments, the transfer plate is positioned in a third location, different from the first and second locations, while delivering material to the load support means. The second layer forming station can be disposed in a preferably horizontal plane, generally above the first layer forming station.

In some embodiments, comprising first and second load forming stations, the palletizer comprises means for positioning the transfer plate for transfer of a layer which is on the transfer plate to a selected one of the first and second load forming stations, and means for transferring a layer of material from the transfer plate to a pallet on the selected one of the first and second load forming stations.

Other objects of the invention are obtained in palletizing apparatus comprising layer forming means for forming a layer of units of material, a special load support means, and a special transfer apparatus, including a transfer plate. The special load support means is adapted to receive delivery of, and to support a plurality of, pallets at a plurality of load forming stations, and to receive delivery of and to support formed layers of units of material to be deposited on the pallets, whereby the layers of material are used to build loads of material on the pallets, the load support means being adapted to receive and support the pallets at the load forming stations in such an arrangement that an incoming layer can be placed on one of more than one of the plurality of pallets, at a corresponding one of the load forming stations, subject to selection of a given one of the load forming stations whereupon the layer is to be placed. The special transfer apparatus is adapted to receive thereon material from the layer forming means, to move with the material thereon, to one of more than one of the load forming stations, and to transfer the material from the transfer plate to the pallet at the one load forming station.

Accordingly, the transfer plate can deliver units of material to a plurality of pallets without laterally moving the pallets and any partial loads thereon.

Still other objectives are obtained in palletizing apparatus comprises layer forming means for forming a layer of units of material, a load support means comprising a plurality of load forming stations, each comprising means to support a pallet and a load thereon, and a special transfer means. The special transfer means comprises (i) a support carriage, (ii) a transfer plate mounted on the carriage, (iii) means to move the transfer plate, along the carriage, from a layer receiving station to a location proximate any one of the load forming stations, and (iv) layer restraining means proximate each load forming station, the layer restraining means being adapted to restrain a layer against substantial horizontal movement thereof while the transfer plate is withdrawn from under the layer.

Preferably, the layer forming means can comprise first and second layer forming stations, and the transfer means can receive material from the first and second layer forming stations.

Still other objects are obtained in palletizing apparatus comprising in combination, a layer forming means for forming layers of units of materials for deposition thereof on a transportable load carrier, a layer holding station adapted to receive and temporarily hold a layer formed by the layer forming means; and a transfer plate adapted to receive a layer from the layer holding station, to move, with the layer thereon, to a load forming station, and to transfer the layer to a pallet load at the load forming station. These embodiments of the palletizing apparatus are adapted to advance all of the units of material which transverse the apparatus, from the layer forming means to the transfer plate, through layer holding station, all the units of material having been incorporated into a layer before any units are placed on the transfer plate.

As in the previous embodiments, the layer forming means can comprise a plurality of layer forming stations which transfer their formed layers to the transfer plate through the layer holding station. The palletizing apparatus of these embodiments is adapted to simultaneously process components of at least three separate layers at respective ones of the processing elements, namely the layer forming means, the layer holding station and the transfer plate.

The invention is also defined in material handling apparatus comprising a layer forming station having a given width; a first conveyor at least as wide as the given width, and aligned and positioned to feed, to the layer forming station, a row of units of material aligned across the conveyor; a second conveyor having a discharge and aligned and positioned to serially discharge a row of units onto the first conveyor and across the width thereof; means to segregate ones of units of material advancing from the second conveyor, and to advance individually, the segregated units of material from the second conveyor onto and across the first conveyor and thus to form a row of the segregated units disposed across the first conveyor in a line, the row corresponding in length to substantially greater than half of the given width of the layer forming station, and being aligned with the discharge end of the second conveyor; means to advance the row, as a distinct row, along the first conveyor, away from the discharge and of the second conveyor and toward the layer forming station; control means to effect and control the formation of additional rows of units of material, and the advance of such rows to the layer forming station; and means to stop the advance of the rows at the layer forming station such that the rows are substantially in contact with each other across the first conveyor. Accordingly, a layer of a plurality of rows of units of material, containing more units of material than rows, can be formed at the layer forming station without any movement of units of material transversely across the first conveyor after their advance thereacross at the discharge end of the second conveyor.

The invention is further defined in palletizing apparatus substantially as above defined and incorporating therein the above described material handling apparatus.

The invention is also defined in methods of building material loads, one family of the methods comprising the steps of receiving delivery of, and supporting, a first pallet, in a load support means at a first load forming station; accumulating units of material by receiving the units and arranging the units into layers to be transported to the load support means, including receiving and arranging first such units of material and fabricating a first such layer at a first layer forming station while concurrently receiving and arranging second such units of material, and thereby fabricating a second such layer at a second layer forming station; and transferring the fabricated layers to the load support means by use of transfer means.

The methods can include receiving a second pallet in the load support means, at a second load forming station, transferring the first and second layers from the transfer means onto the first and second pallets at said first and second load forming stations, respectively, whereby the first and second layers are combined into first and second pallet loads at the respective ones of said first and second load forming stations.

In some embodiments the transfer means is positioned at a first location to receive the first layer from the first layer forming station, and is positioned at a second location, different from the first location, to receive the second layer from the second layer forming station.

The methods can include positioning the transfer means at a first location to receive the first layer from the first layer forming station, and positioning the transfer means at a second location, different from the first location, to receive the second layer from the second layer forming station.

Alternatively, in some embodiments the transfer means is positioned in the same position for transferring the first layer from the first layer forming station onto the transfer means, and for transferring the second layer from the second layer forming station onto the transfer means.

The method can include transferring the first layer to the load support means at a first load forming station and transferring the second layer to said load support means at a second load forming station, which may be above or beside the first load forming station.

In some embodiments, the transferring step can comprise combining the first and second layers into the same pallet load.

Some embodiments of the method comprise the steps of feeding first and second groups of units of material to first and second layer forming stations, respectively, and forming first and second layer portions thereof; and transferring the first and second layer portions from respective ones of the first and second layer forming stations, to a load, to thereby form a hybrid layer on the load, the hybrid layer comprising units of material from both of the first and second groups. The method can include first transferring the first and second layer portions to a transferring means, thereby forming the hybrid layer at the transfer means, and subsequently transferring the formed hybrid layer, as a unitary layer, from the transfer means to the load.

The method can comprise positioning the transfer means at a first location to receive the first layer portion from the first layer forming station and positioning the transfer means at a second location to receive the second layer portion from the second layer forming station.

Conversely, the method can comprise positioning the transfer means in a given position, and transferring both the said first and second layer portions onto the transfer means while the transfer means is in the given position.

Still other embodiments of the method comprise the steps of forming a first layer at a layer forming station; advancing the first formed layer from the layer forming station to a layer holding station; advancing the first formed layer from the layer holding station onto a transfer plate; moving the transfer plate, with the first layer on it, to a load forming station; and transferring the first layer to a pallet or other load support means, at the load forming station. The method can include building a second layer at the layer forming station during at least one of the last three steps. It can also include advancing the second layer to the layer holding station, and holding the second layer in the layer holding station during at least one of the last two steps, and it can include building a third layer at the layer forming station while the second layer is being held in the layer holding station.

In some embodiments, the method comprises forming layers of units of material in a palletizing apparatus comprising an in-feed conveyor, a layer forming station, a layer holding station, stop means between the layer forming station and the layer holding station, a transfer plate, and pushing means, having a retracted position, and being adapted to extend therefrom and thereby to push a layer from the layer holding station onto the transfer plate. In this environment, the method can comprise the steps of sensing the absence of a layer in the layer holding station; sensing the position of the pushing means in the retracted position; and in response to above sensing steps, retracting the stop means even though a first layer is not fully formed at the layer forming station, such that units of material at the layer forming station, and/or advancing along the in-feed conveyor, advance through the layer forming station directly to the layer holding station, whereby at least completion of the forming of the layer from those units, takes place at the layer holding station.

The method can include extending the stop to an extended position after the last units of the first layer advance past the stop, thereby preventing advance of additional units of material into the layer holding station; and maintaining the stop extended while pushing the first layer out of the layer holding station by extending a pushing means from a retracted position, and thereby accumulating any units of material advancing into the layer forming station and using the advancing units to form a second layer.

In yet other embodiments, the method comprises handling units of material in material handling apparatus, and thereby forming layers of material from units of material, at layer forming means having a given width, each layer having a width, the method comprising the steps of advancing units of material along a first conveyor toward a discharge end thereof, for discharge onto and across a second conveyor, the second conveyor having a first width at least as large as the width of the layers being formed; segregating a first subset of the units of material and advancing the first subset of the units of material, from the first conveyor, onto and across the second conveyor, and thereby forming a row of the segregated units disposed across the second conveyor, the row corresponding in length to substantially greater than half, but no more than all, of the width of the layer forming means; advancing the row longitudinally along the second conveyor, in disposition thereacross, and away from the discharge end of the first conveyor; segregating and advancing a second subset of the units of material onto and across the second conveyor and thereby forming a second such row, such that the second row extends transversely across the second conveyor and is disposed behind the first row; advancing the first and second rows jointly along the second conveyor until the first row abuts a stop barrier and is stopped thereby, and the second row abuts the first row and is stopped thereby; and discharging additional subsets of the units of material from the first conveyor, and forming additional rows therewith as desired, and advancing the additional rows along the second conveyor and against the first and second rows to thereby complete the forming of a layer with a first set of the units of material, the first set comprising the combination of the subsets. Preferably, the method includes advancing the one layer onto a transferring means and transferring the one layer from the transferring means to a pallet load.

Also, the forming of the layer is preferably accomplished at a layer forming stating, and the method includes advancing the layer from the layer forming station to a layer holding station, from the layer holding station to the transferring means, and transferring the layer from the transferring means to a pallet load, optionally including the steps of selecting one, of more than one, pallet load for transferring the layer thereto, and transferring the layer to the selected load. In such case, preferably the pallet loads are disposed at respective load forming stations, the transferring means comprises a transfer plate mounted for substantially horizontal movement along a supporting carriage between a receiving station and a plurality of discharge stations disposed intermittently along the carriage, in a direction aligned with the direction of travel of the transfer plate, adjacent the load forming stations, and the method includes the steps of receiving the layer onto the transfer plate at the receiving station, subsequently moving the transfer plate with the layer on it past the nearest one of the discharge stations to a more distant one of the discharge stations, adjacent one of the load forming stations, and transferring the layer to the load or pallet at the corresponding load forming station.

In these embodiments also, the method includes concurrently receiving ones of a second set of said units of material at a layer forming station adjacent the transfer station, and using the second set of said units of material in forming a second layer while the first layer is being positioned at a transfer station and transferred from the transfer station to a transfer plate. The concurrent forming of the second layer can be accomplished with third and fourth conveyors being used respectively in forming the second layer instead of the recited first and second conveyors, and wherein the first row of the second layer is abutted against a second stop located between the layer forming station and the adjacent transfer station.

BRIEF DESCRIPTION OF THE DRAWINGS

FIG. 13 shows a partial front elevation view taken at 13—13 of FIG. 12.

DETAILED DESCRIPTION OF THE ILLUSTRATED EMBODIMENTS

Figure 1:
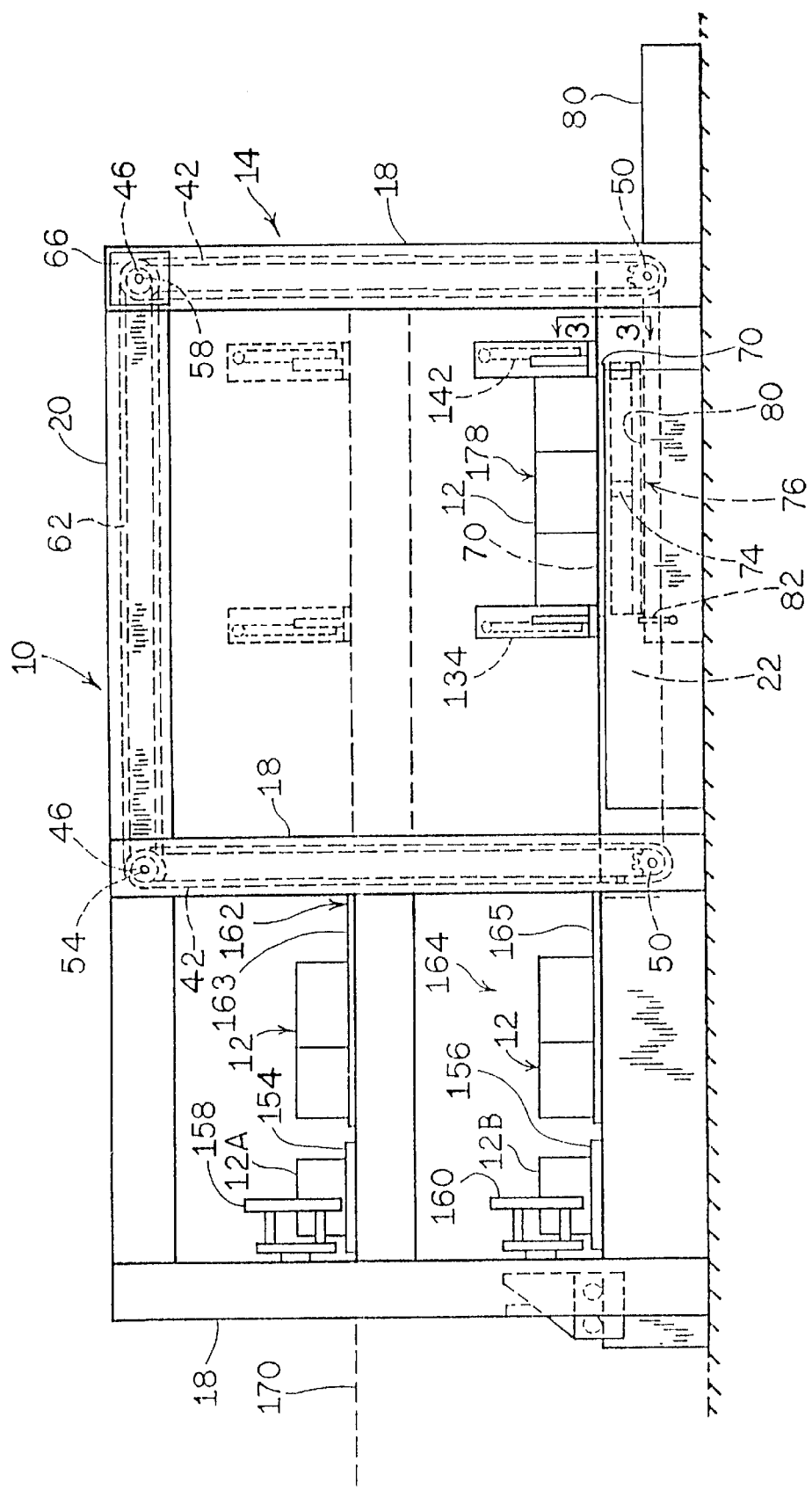
FIG. 1 shows a side elevation view of a first embodiment of a palletizer of the invention wherein the layer forming stations are vertically spaced one above the other.
Figure 2:
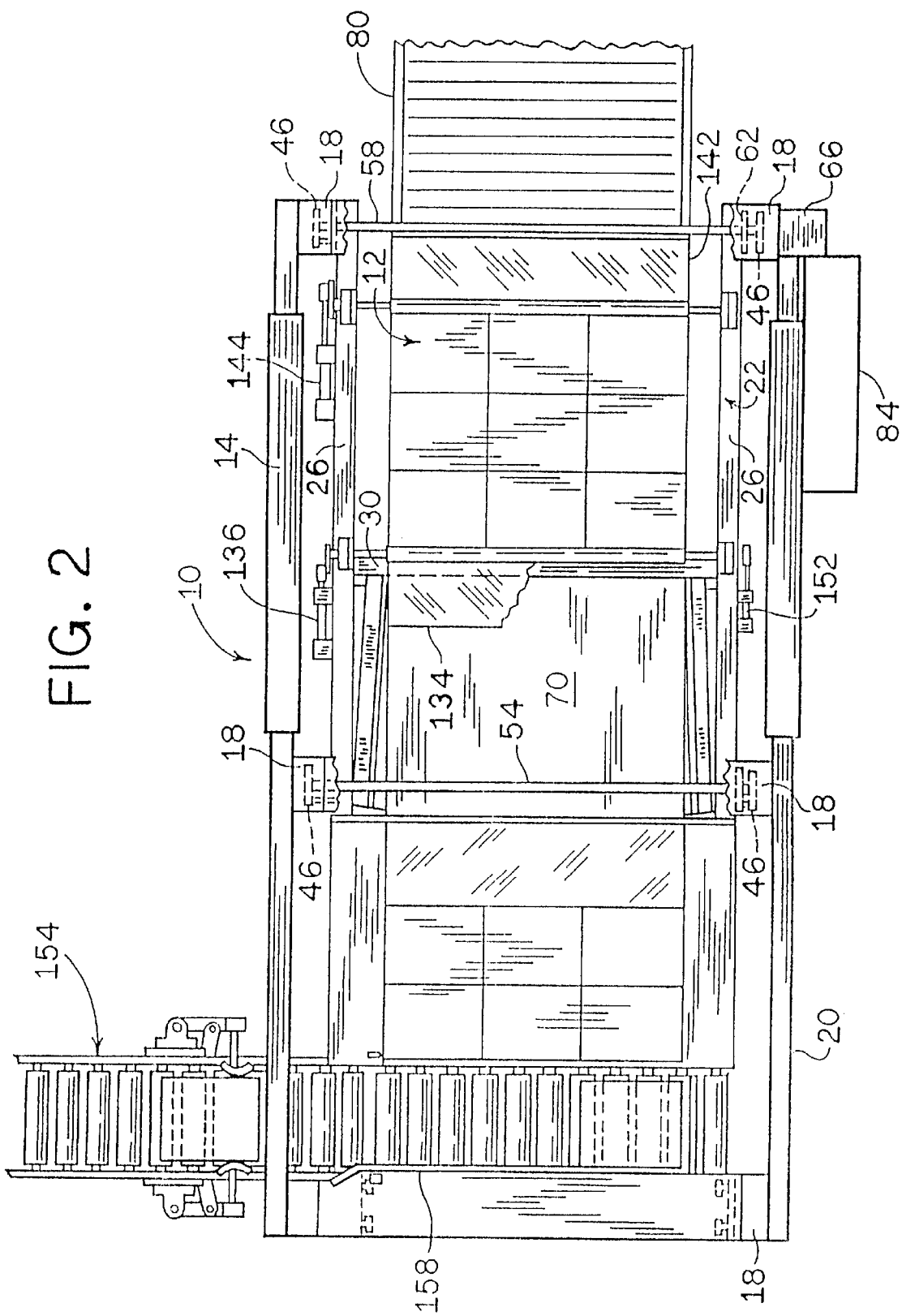
FIG. 2 shows a plan view of the palletizer of FIG. 1, with the transfer plate moved to the left position.

A palletizer 10 showing a first embodiment of the invention is illustrated in FIGS. 1 and 2. The palletizer 10 is usable for depositing units of material 12 such as cases or stacks of product on a supporting surface such as a pallet, a carrying plate, or a previously deposited layer of such material. As used herein the term "units of material 12" is generic to any discrete units which can be conveyed to and through the material handling equipment of this invention, and carries a suffix letter such as "A", "B", etc. when referring to a specific product line or a specific set of units of material.

As best shown in FIGS. 1 and 2, the palletizer 10 comprises a frame 14 including a plurality of generally vertical members or posts 18 defining e.g. the four corners of a rectangle, and upper members 20. The palletizer 10 also comprises a generally rectangular, horizontally disposed carriage 22 having opposite first and second or right and left ends and four corners respectively connected to four of the posts 18 of the frame 14 for vertical movement relative thereto.

Figure 3:
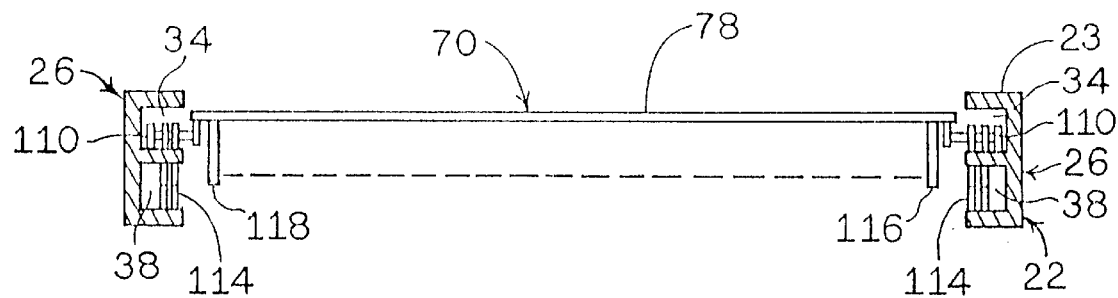
FIG. 3 shows an end view of the transfer plate and is taken along line 3—3 of FIG. 1.

In the illustrated construction, the carriage 22 includes first and second generally parallel, horizontally spaced apart side members 26 connected by a central support member 30. As best seen in FIG. 3, each of the side members 26 has an E-shaped cross-section and defines upper and lower channels 34 and 38 opening inwardly and having opposed upper and lower generally horizontal surfaces.

The palletizer 10 also comprises means for reciprocally, vertically moving the carriage 22 relative to the frame 14. In the preferred embodiment, the means for moving the carriage 22 includes means on four of the frame posts 18 for causing relative movement of the respective corners of the carriage 22. Preferably, the means for causing relative movement includes an endless chain 42 connected to the respective corner of the carriage 22. As best shown in FIG. 1, each of the respective left and right posts 18 includes an upper drive sprocket 46 and a lower idler sprocket 50. The upper sprockets 46 of the two left ones of the respective posts 18, as viewed in FIG. 2, are connected by a horizontal drive shaft 54, and the upper sprockets 46 of the two right ones of the respective posts 18, as viewed in FIG. 2, are connected by a horizontal drive shaft 58. Also, the upper sprockets 46 of the two lower posts 18, as viewed in FIG. 2, are connected by an endless drive chain 62, also seen in FIG. 1. Drive means 66 is connected to the drive shaft 58 to drive the two right chains 42, and, via the endless chain 62 and the drive shaft 54, to the two left chains 42. Accordingly, the four endless chains 42 move in common, thereby causing common movement of the four corners of the carriage 22.

The palletizer 10 also comprises generally horizontal transfer plate 70 mounted on the carriage 22 for reciprocal horizontal movement relative to the carriage 22 between a first, or right position (FIG. 1) wherein the transfer plate 70 is adjacent the first, or right, end of the carriage 22 and a second, or left, position (FIG. 2) wherein the transfer plate 70 is adjacent the second or left end of the carriage 22.

A pallet 74 is placed at a load forming station 76 which is adjacent the first end of the carriage 22 so that, when the transfer plate 70 is in the first position it is above the pallet 74. Transfer plate 70 includes an upwardly facing surface 78 adapted to carry the articles or stacks of materials to be palletized during movement of the transfer plate 70 from the second or left position to the first or right position.

Transfer plate 70 is mounted on the carriage 22 by a first pair of wheels 110 rotatably mounted on one side of the transfer plate 70 and received in the upper channel 34 of the first carriage side member 26 for rolling movement along one of the upper and lower surfaces of the corresponding channel 34, and a second pair of wheels 110 rotatably mounted on the other side of the transfer plate 70 and received in the upper channel 34 of the second carriage side member 26 for rolling movement along one of the upper and lower surfaces of the corresponding channel 34. Normally, as shown in FIG. 3, the wheels 110 roll along the lower surfaces of the channels 34.

The palletizer 10 further comprises means for reciprocally moving the transfer plate 70 between the first or right position and the second or left position. In the preferred embodiment, the means for moving the transfer plate 70 includes, at each of the side members 26 of the carriage 22, an endless chain 114 extending through the upper and lower channels 34 and 38, and connected to transfer plate 70. The endless chains 114 are connected to a common drive means (not shown).

The palletizer further comprises means for stopping downward movement of the carriage 22 relative to the supporting surface (e.g. the pallet or a previously deposited layer). In the preferred embodiment, the means for stopping downward movement of the carriage 22 includes an electric eye 116 and sensor 118, typically mounted on transfer plate 70, and a control means for stopping downward movement of the carriage 22 when the circuit set up through the electric eye and sensor is interrupted by the pallet, or layer on the pallet.

Carriage 22 includes a leading end plate 134 pivotally moveable between a raised position (FIG. 2) wherein the end plate 134 is parallel to the transfer plate 70, and a lowered position (FIG. 1) wherein the end plate 134 is perpendicular to the transfer plate 70. Linear motion means 136 for moving the plate 134 between the raised and lowered positions is shown in FIG. 1.

The carriage 22 also includes a trailing end plate 142 similar to leading end plate 134 for restraining the materials 12 when the transfer plate 70 is in the first or right position. Linear motion means 144 for moving the plate 142 between its raised and lowered positions is shown in FIG. 1.

Palletizer 10 comprises first and second in-feed conveyors 154 and 156 (FIGS. 1 and 2) adjacent the left end thereof. Conveyors 154 and 156 extend generally perpendicular to the direction of horizontal movement of transfer plate 70. Respective first and second pusher means 158 and 160 are adapted to move units of material 12 from the conveyors 154 and 156 respectively onto the transfer plate 70 when the transfer plate is in the second or left position and at the appropriate height, whereby layers of units of material are formed on the transfer plate. In the illustrated construction, the conveyors 154 and 156 are conventional roller conveyors. In the preferred embodiment, the palletizer 10 includes layer forming stations 162 and 164 (FIGS. 1 and 2) between the respective pusher means at the ends of the respective conveyors 154 and 156, and the respective second positions of the transfer plate 70. A "layer forming station," by definition, includes sufficient support surface area that a full layer can be formed thereon. Thus in the embodiment of FIGS. 1 and 2, the layer forming station includes both the end of the respective conveyor 154 or 156 and the adjacent layer support surface plate 163 or 165. The layer can, of course, be defined as having a smaller size whereby the entire layer can be situated on the plate 163 or 165 if desired. Layer forming station 162 is in a plane 170 which is disposed vertically above layer forming station 164. Layer forming stations 162 and 164 permit entire layers of material to be arranged and formed before being pushed onto the transfer plate 70. Preferably, the means for moving material from the conveyor means 154 and 156 onto the transfer plate 70 includes pusher means 158 and 160 being reciprocally movable across the respective conveyors 154 and 156, and the plates 163 and 165 along the line of the direction of movement of the transfer plate 70. It will be understood that the left position of transfer plate 70 is defined without regard to the elevation of carriage 22, whereby the transfer plate may be adjacent layer forming station 164 as shown in FIG. 2 or adjacent layer forming station 162, at a position directly vertically thereabove, or at any position vertically displaced therefrom.

The load forming station 76, in its broadest sense, is a support means which supports the pallet and the load as the layer is formed. The load forming station can be as simple as the floor, a table, a platform, a plate, or the like. Preferably, the load forming station comprises a supporting conveyor 80 and associated conventionally retractable stops, one of which is shown at 82, for positioning a pallet on the conveyor 80 in a predetermined location to receive the layers of material in the process of forming a load. A second stop, not shown, is typically employed on the opposite side of the pallet from the illustrated stop 82. Accordingly, the load forming station is defined by an underlying support means and side edge boundaries which define a space on the support means within which the pallet is confined while the load is being formed. The side edge boundaries may be defined by a physical barrier such as stop 82, or may be open, whereby they are established by previous positioning of the pallet such as along the longitudinal axis of travel of the conveyor 80.

The palletizer 10 operates as follows. A pallet 74 is placed beneath the right end of the frame 14, as shown in FIG. 1. Individual units of material 12, e.g. cases of product, are transported to the palletizer 10 by one or both of the two infeed conveyors 154 and 156. The units 12A of material are illustrated as being transported on upper conveyor 154, and units 12B of material are illustrated as being transported on lower conveyor 156. When an entire row of units is assembled at the end of the respective one of conveyors 154 or 156, the corresponding pusher 158 or 160 pushes the row of units onto the respective adjacent layer support surface plate 163 or 165. This process continues at each of the support surface plates 163 and 165 until the respective layer forming station, including the support plate and the respective conveyor 154 or 156, is filled with an entire layer of units of material. When one of the layer forming stations has a full layer thereon (optionally including a row on the respective in-feed conveyor), e.g. station 164, the transfer plate 70 is positioned in the left position adjacent the respective layer forming station, with the carriage 22 at a height such that the top of the transfer plate 70 is generally level with the respective layer forming station 162 or 164. The respective pusher 158 or 160 then pushes the entire layer of materials onto transfer plate 70.

Figure 4:
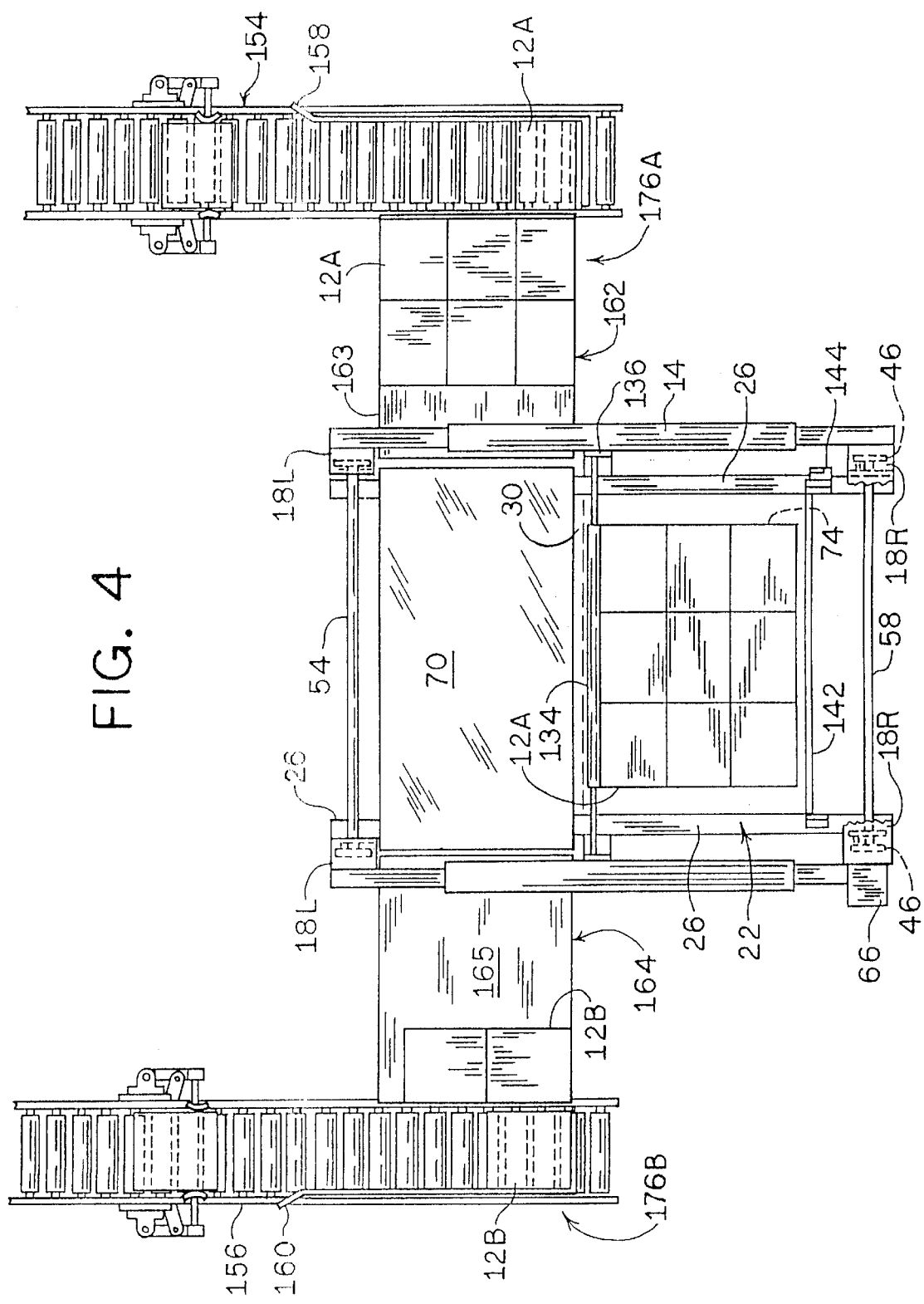
FIGS. 4 and 4A show plan views of palletizers of this invention, wherein layer forming stations are horizontally situated on opposing sides of the transfer plate.
Figure 5:
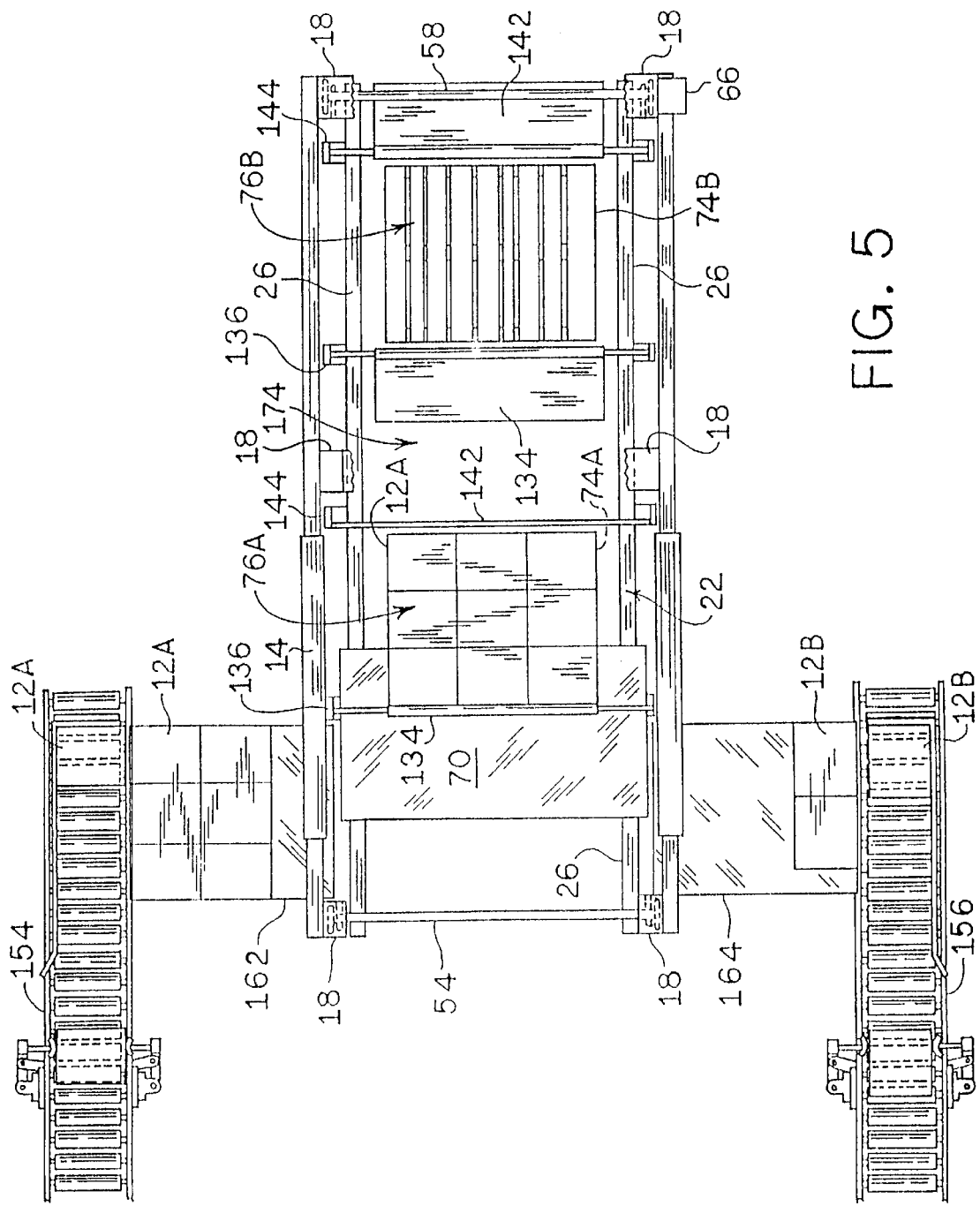
FIG. 5 shows a plan view of the palletizer of FIG. 4, with a second load forming station, both stations being serviced by the one transfer plate.

Next, the carriage 22 moves to a height such that transfer plate 70' is at an elevation above the top of the supporting surface at the load forming station (either the pallet or a previously deposited layer of material). The transfer plate 70 then moves to the right position whereby it is directly above the pallet 74 which is positioned in the predetermined location defined by the load forming station, and is directly below the transfer plate 70. Carriage 22 is then lowered until the circuit of electric eye 116 and sensor 118 under transfer plate 70 is interrupted by either the pallet 74, or a layer on the pallet, whereupon carriage 22 is stopped with appropriate delay to position the transfer plate 70 immediately above the underlying surface onto which the layer is to be placed. Next, end plates 134 and 142 are lowered into vertical orientation, as seen in FIG. 1. Transfer plate 70 is then withdrawn from the right to the left. Partial withdrawal is shown in FIG. 5, and full withdrawal is illustrated in FIGS. 2 and 4. As the transfer plate 70 moves to the left, the end plate 134 prevents the units of material on the transfer plate 70 from moving with the transfer plate 70. Conventionally, retractable stop 82, which is mounted on carriage 22, prevents the pallet, from moving with transfer plate 70 in the event of contact between transfer plate 70 and the underlying layer while transfer plate 70 is being withdrawn.

When the transfer plate 70 reaches the left position, end plates 134 and 142, are returned to the raised (horizontal) position.

The transfer plate 70 is then positioned to similarly receive a layer from one of the layer forming stations, typically the other of the layer forming stations, namely station 162, and the process is repeated.

A conventional machine control unit 84 (FIG. 2) is used to control the several steps of the operation just described, with sensors, control signals and moving means being used in known manner to achieve the above described steps. The control unit can be used to effectively set the criteria for ordering or prioritizing which layer forming station is to be serviced by transfer plate 70, in what sequence, and under what conditions. For example, the sequencing can provide for receiving layers from layer forming stations 162 and 164 in alternating order. Layer forming station 164 could take priority over layer forming station 162, or vice versa. Such priority will be conditioned on defined factors, such as (i) the availability of the correct pallet 74 being at the load forming station, (ii) the amount of material disposed up-stream from the infeed conveyors 154, 156, and the like. The ability to effect such conditional sequencing in the control unit is well known in the art of material handling machines and so is not further described here.

As seen from the above description of FIGS. 1–3, the palletizer described therein can receive units of material 12 from two separate and distinct infeed conveyors 154, 156, can process them through two separate and distinct layer forming stations 162, 164, and can place them on pallet 74 using a single carriage 22 and a single transfer plate 70. Accordingly, this invention provides means adapted to feed material from a plurality of product lines directly to a plurality of layer forming stations of the palletizer, where the material is accumulated in the palletizer and formed into load layers which are pushed onto the transfer plate 70; with the accumulating areas (the plural layer forming stations) being adapted, in combination, to hold more than one layer at a time. In prior art teachings, e.g. U.S. Pat. No. 3,836,018 Dawson et al, separate product lines feed a common in-feed conveyor, whereby travel delays on the in-feed conveyor can cause less efficient use of the palletizer transfer plate, especially when the speed of the in-feed conveyor is necessarily kept slow. Namely, the prior art teaches using the product conveyors (ahead of the in-feed conveyor) as the means to accumulate product flow, whereby a maximum of one load layer is accumulated in the palletizer ahead of the transfer plate 70 at any given time. In the invention herein, the accumulating function takes place at the plurality of layer forming stations of the palletizer, whereby a plurality of layers and/or partial layers can be accumulated in the palletizer at one time. Therefore, full flow of a given product can be maintained all the way to the palletizer while a different product is being processed by transfer plate 70, whereby the transfer plate 70 does not have to wait for product as often, and the linear speed of product flow on each of the plurality of infeed conveyors can be reduced. As a result, products which are easily tipped, and are therefore difficult to transport by conveyor are more easily handled. Also, slower drive speeds reduce wear and tear on equipment. Finally, the output of a plurality of product lines can be processed efficiently through a single palletizer.

In some embodiments, the vertical stacking of the layer forming stations 162, 164 is less preferred, and a horizontal arrangement thereof is more preferred. Such a horizontal arrangement is shown in top view in FIG. 4. In this arrangement, and as viewed from transfer plate 70 toward pallet 74, layer forming station 162 is to the left of transfer plate 70, along with pusher 158. Elongated, spaced apart units of material 12A, 12C are shown on conveyor 154. Layer forming station 164 is to the right of the transfer plate 70, along with pusher 160. Substantially square units of material 12B, 12D are shown in spaced arrangement on conveyor 156. Accordingly the infeed subsystems 176A and 176B, comprising the respective ones of the in-feed conveyor, the pusher and the layer forming station, are mirror images of each other in the embodiment illustrated in FIG. 4. The in-feed subsystems are positioned such that they are both at the same elevation whereby the top of the transfer plate 70 can be brought to a height such that the tops of both layer forming stations 162, 164 are level with the top of the transfer plate 70; whereupon a layer can be pushed onto transfer plate 70 from either layer forming station 162 or 164 from a common vertical and horizontal positioning of transfer plate 70 as shown in FIG. 4.

Figure 10:
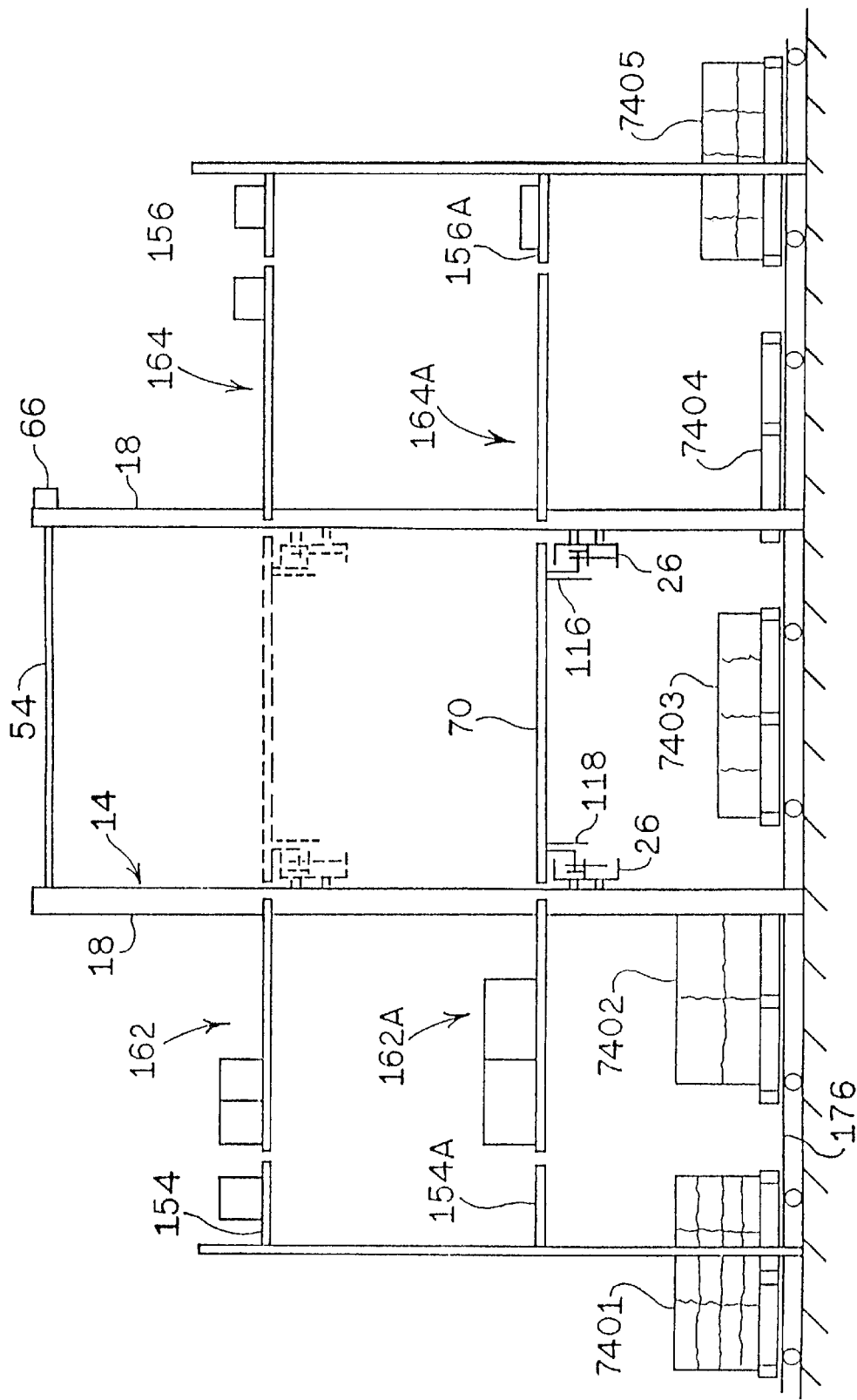

Comparing the illustrations of FIGS. 2 and 4, it is seen that a few minor changes have been made to the palletizer structure of FIG. 2 in order to arrive at the structure of FIG. 4, which accommodates transfer of materials to transfer plate 70 from the side-located layer forming stations. For example, left posts 18L adjacent the transfer plate 70, at its left position, have been moved to the left to provide clear transfer space between the layer forming stations 162 and 164 and plate 70, while right posts 18R are in the same positions as in the embodiment of FIG. 2. The edges of transfer plate 70 have been extended over the top edges 23 of side members 26 of carriage 22 in order to minimize the space between transfer plate 70 and layer forming stations 162, 164. Such edge extensions are also seen in FIG. 10.

A typical operation of the palletizer 10, as illustrated in FIG. 4, is similar to the operation of the embodiment of FIGS. 1–3, except that transfer plate 70 is located at the same vertical position when picking up a layer from either of the layer forming stations 162, 164.

As shown in FIG. 4, while transfer plate 70 is processing material 12A from layer forming station 162, onto pallet 74, the first layer of what will be the subsequent pallet load, is being built on layer forming station 164, whereby when pallet 74 is full, transfer plate 70 can pick up the first load layer from layer forming station 164 while the full pallet 74 is being removed and the subsequent pallet is being brought into place to receive the first layer from layer forming station 164. By appropriate timing of the machine movements, the first layer from layer forming station 164 can be brought into a position vertically over the subsequent pallet simultaneously with the arrival of the subsequent pallet.

Figure 4A:
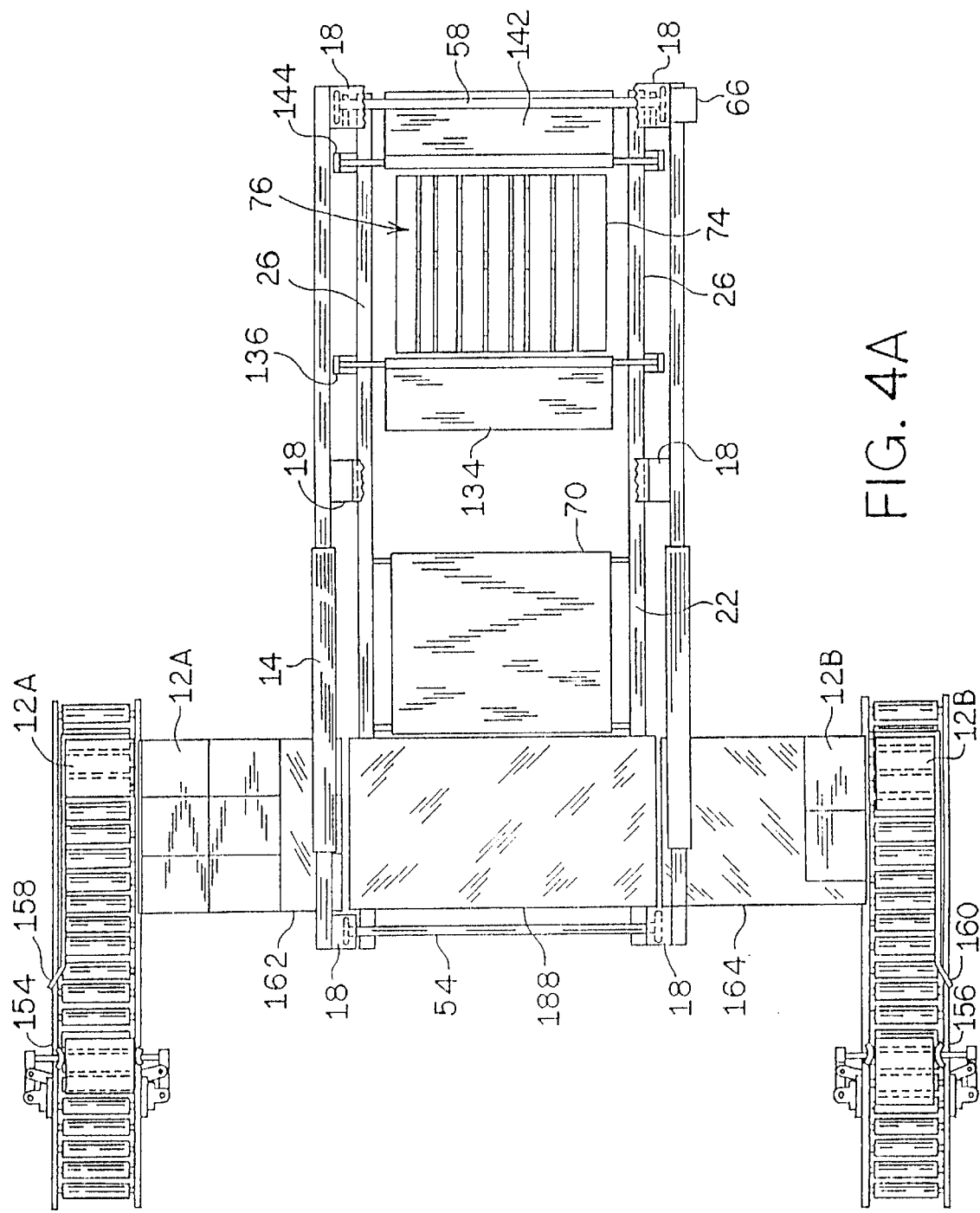

The embodiment shown in FIG. 4A is the same as that shown in FIG. 4 except that a holding station 188 is interposed between the forming stations 162,164 and the transfer plate 70. Holding station 188 is typically a flat plate and is fixedly secured to the frame 14 at a height corresponding to the height of the support surfaces of layer forming stations 162,164. After a layer of units of material is formed in a forming station 162,164, it is transferred from the respective forming station to the holding station 188 by the respective pusher 158,160. The layer is subsequently transferred by e.g. a pusher (not shown) from holding station 188 to transfer plate 70, whereupon the layer is delivered to the load forming station 76 and transferred to the load in the above described manner.

The palletizing equipment of FIG. 4A can be concurrently processing components of at least three, and potentially four layers or partial layers at any given time; namely one layer or part thereof on each of layer forming station 162, layer forming station 164, layer holding station 188 and transfer plate 70.

In FIG. 5, the palletizer of FIG. 4 has been modified such that layers of materials 12A and 12B can be placed on loads being concurrently built on pallets 74A and 74B respectively, at the two respective load forming stations 76A and 76B. The load forming stations 76A and 76B are sufficiently spaced from each other, by space 174, to allow positioning and operating of transfer plate 70 between the pallets 74A and 74B, and the loads on them; the combination of load forming stations 76A and 76B and space 174 comprising a special load support means adapted to receive delivery of, and support layers of, units of material 12 on either or both of two pallets without having to move either pallet for the purpose of putting a layer on the other pallet, each pallet comprising a layer support surface for supporting a layer thereon. In modifying the palletizer of FIG. 4, to arrive at the embodiment shown in FIG. 5, carriage 22 has been extended, as at side members 26, and drive chain 114, so that transfer plate 70 can be positioned to deposit layers, in sequence or as desired at both load forming stations 76A and 76B. Further, an additional set of posts 18, and horizontal upper frame members are preferably used to provide frame support therefore. Carriage 22 is suspended from the right and left end ones of posts 18, whereupon the drive mechanism 66 has been accordingly moved to one of the right posts 18, with respective extension of drive chain 62. A second set of leading and trailing end plates 134 and 142 respectively, and respective linear motion means 136 and 144, are mounted on carriage 22 adjacent layer receiving station 76B as shown.

In the operation of the palletizer 10 of FIG. 5, pallets 74A and; 74B are positioned as shown. With the pallets in position, layers are picked up by transfer plate 70, from layer forming stations 162, 164 and are placed on the pallets 74A and 74B. Material from either layer forming station 162 or 164 may be selected for placement on either pallet 74A or 74B, and same is controlled through controller 84. Where the materials 12A and 12B are different, typically, the segregation of the materials will be maintained, whereby materials 12A will go on one pallet e.g. 74A and the materials 12B will go on the other pallet e.g. 74B. Accordingly, a plurality of pallet loads can be built concurrently without necessarily moving the pallets in the process until a desired loading is achieved for a given pallet. Additional load forming stations may be added by further extending carriage 22, or by arranging the layer receiving stations vertically one above the other, much like the layer forming stations 162, 164 are vertically arranged in FIGS. 1–2. Such vertically spaced layer forming stations can, for example, be supported from the upper members 20 of frame 14.

The operation of the palletizer 10 illustrated in FIG. 5 is substantially the same as the palletizer of FIG. 4, with the added ability to place materials on a pallet in a second load forming station 76B. Placement of a layer on the pallet 74A in load forming station 76A is substantially the same as in the embodiment of FIG. 4. Placement of a layer on the pallet 74B is similar in that the load is placed on the pallet, or the underlying layer, accompanied by generally vertical movement of carriage 22 and cooperating horizontal movement of transfer plate 70 to bring the transfer plate to a position over, and closely spaced from the underlying pallet or layer: As the transfer plate 70 is then withdrawn from under the layer being deposited with end plates 134 and 142 vertically down), transfer plate 70 moves into space 174 between the load forming stations 76A and 76B. Upon full withdrawal, from under the layer, transfer plate 70 is returned to the left position with appropriate vertical movement of carriage 22 such that transfer plate 70 avoids hitting any material 12 on pallet 74A; whereupon the transfer plate 70 is ready to receive another layer 178.

Figure 6:
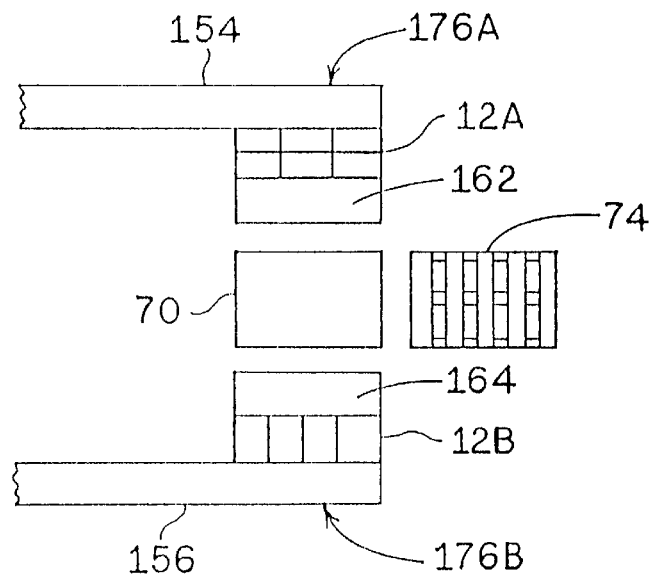
FIGS. 6–8 illustrate the construction of a load layer using load materials from two different layer forming stations.
Figure 7:
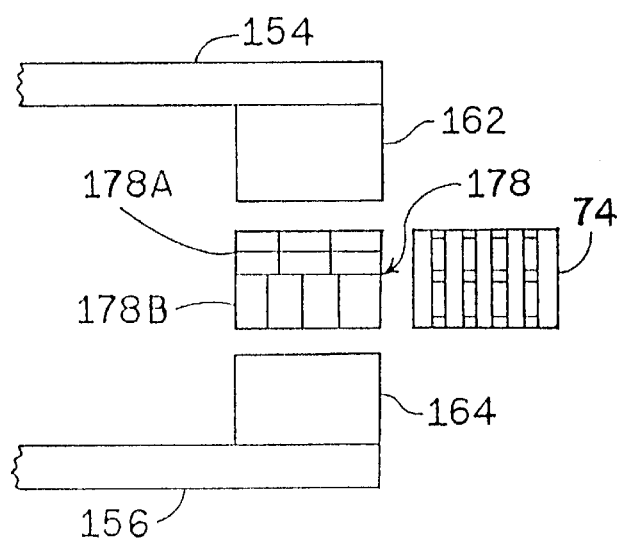
Figure 8:
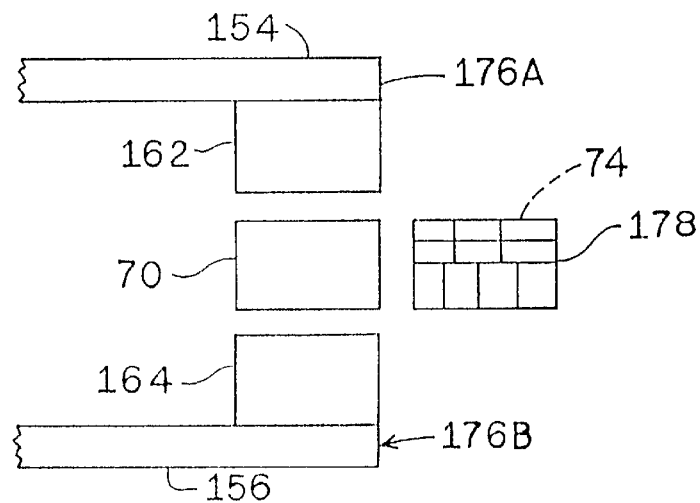

FIGS. 6–8 illustrate a sequence of operations related to a method of building pallet loads wherein materials 12A and 12B from the respective layer forming stations 162, 164 are combined into a single layer on transfer plate 70.

Turning now to FIG. 6, units of material 12A and 12B are fed, along the respective in-feed subsystems 176A and 176B into the respective layer forming stations 162, 164. As seen in FIG. 6, sufficient materials 12A and 12B are fed into the respective layer forming stations that the combination of the materials in layer forming stations 162, 164 comprises no more than the space occupied by a single full layer. In the embodiment illustrated, each grouping of units of materials 12A and 12B comprises one half of a layer.

Each half layer is then pushed onto the transfer plate 70 by its respective pusher 158, 160 (not shown) whereupon the hybrid layer 178 on the transfer plate is as shown in FIG. 7, the layer 178 comprising the composite of the partial layers 178A and 178B; they being comprised of the corresponding units of material 12A and 12B respectively. Hybrid layer 178 is then transferred to pallet 74 in the manner described above. Hybrid layer 178 is shown as transferred in FIG. 8.

The fractional/partial layers 178A and 178B on transfer plate 70 can comprise more, or less, than half layers so long as the sum of the layer fractions is no greater than one. The sum can be less than one.

Figure 9:
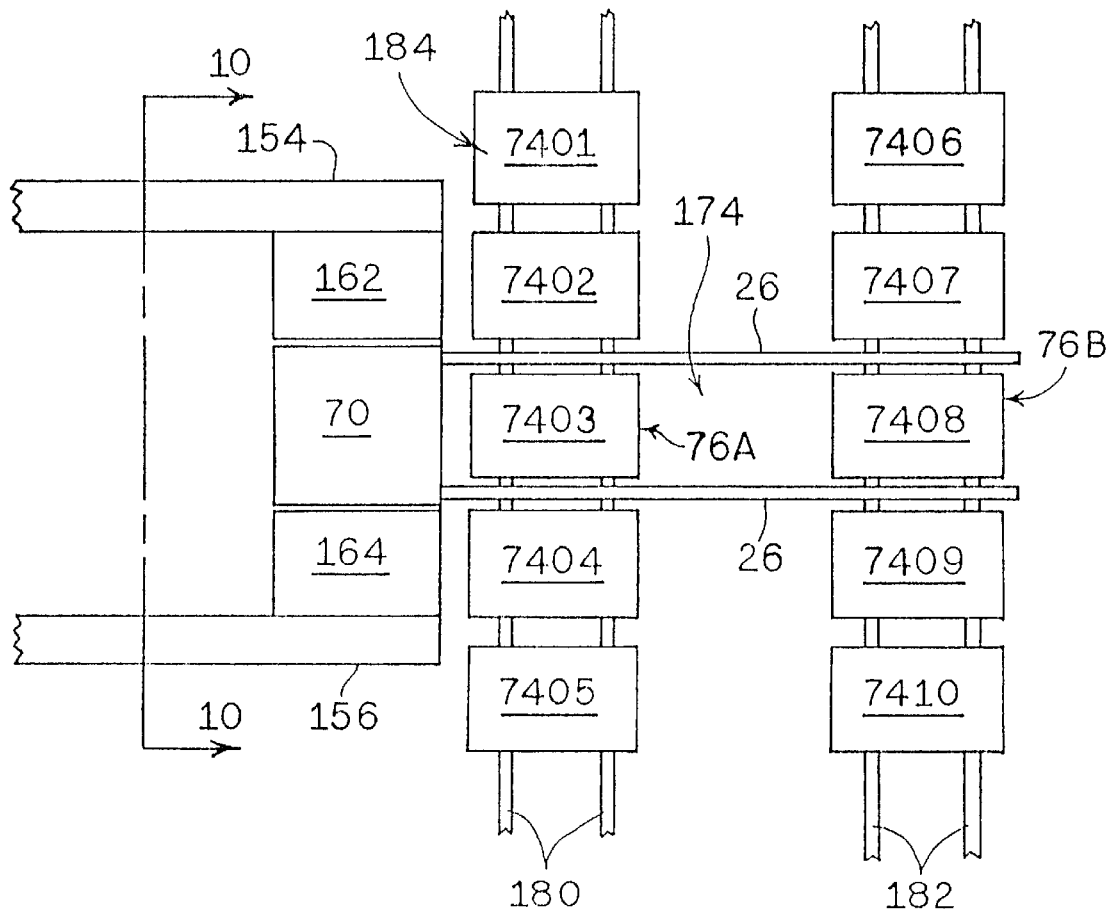
FIGS. 9–10 illustrate vertical stacking of horizontally disposed layer forming stations.

FIGS. 9 and 10 show a top view and an end view respectively of another embodiment of the invention, illustrating further principles thereof, and wherein the palletizing operation is perhaps better defined as operating within a palletizing system.

Referring to both FIGS. 9 and 10, the system comprises four layer forming stations 162, 162A 164, and 164A, the layer forming stations being spaced both horizontally and vertically as shown. Each respective layer forming station is preferably, but not necessarily, fed by its own in-feed conveyor 154, 154A, 156, or 156A. Transfer plate 70 is as configured in the previous embodiments of FIGS. 4 and 5, and is adapted to move to any one of the layer forming stations to receive a layer of material. Pallets 7401 to 7405 are disposed on a first shuttle track 180, whereby they can be shuttled back and forth to position any one of the pallets into the load forming station 76A occupied by pallet 7403 in the illustration in FIG. 9. The pallets are carried on one or more suitable carriers 176 for transport on track 180. Suitable such carriers are illustrated in U.S. Pat. No. 3,986,620 Wilde et al, the disclosure of which is herein incorporated by reference as to its teaching with respect to pallet carriers and methods for their use.

Pallets 7406 to 7410 are shown disposed on a second shuttle track 182, whereby they can be shuttled back and forth to position any one of the pallets into a second load forming station 76B occupied by pallet 7408 in the illustration of FIG. 9. The second load forming station, and the structure related thereto are illustrated in FIG. 5.

In the embodiment of FIGS. 9–10, transfer plate 70 can receive a load layer 178 from any one of layer forming stations 162, 162A, 164, 164A, or from a combination thereof as illustrated in FIGS. 6–8. The layer received onto transfer plate 70 can then be transferred to any one of the pallets 7401–7410 by presentation of the selected pallet at the appropriate one of the load forming stations 76A or 76B, as discussed with respect to the previous embodiments; and depositing of the layer on the selected pallet.

Frame 14 is shown only minimally in FIG. 10, and not at all in FIG. 9. It will be understood that a frame 14 is now readily devised as structural support for any of the embodiments of the invention in accordance with the disclosure in e.g. FIGS. 1, 2, 4, and 5, as well as the ordinary level of skill in the machine art.

Figure 11:
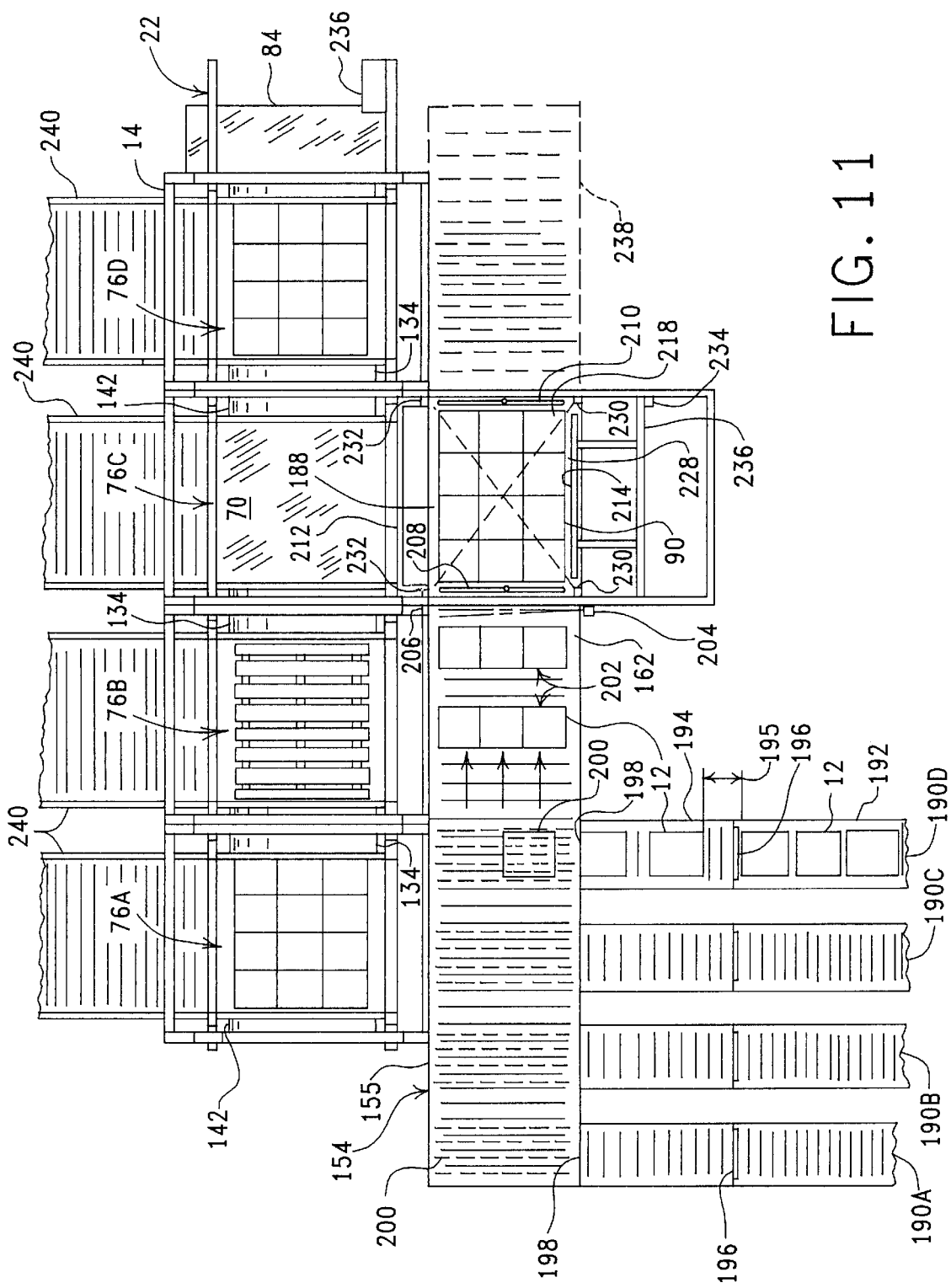
FIGS. 11 and 11A show plan views of other embodiments of palletizers of the invention, embodying layer holding stations between the transfer plates and the layer forming stations.
Figure 12:
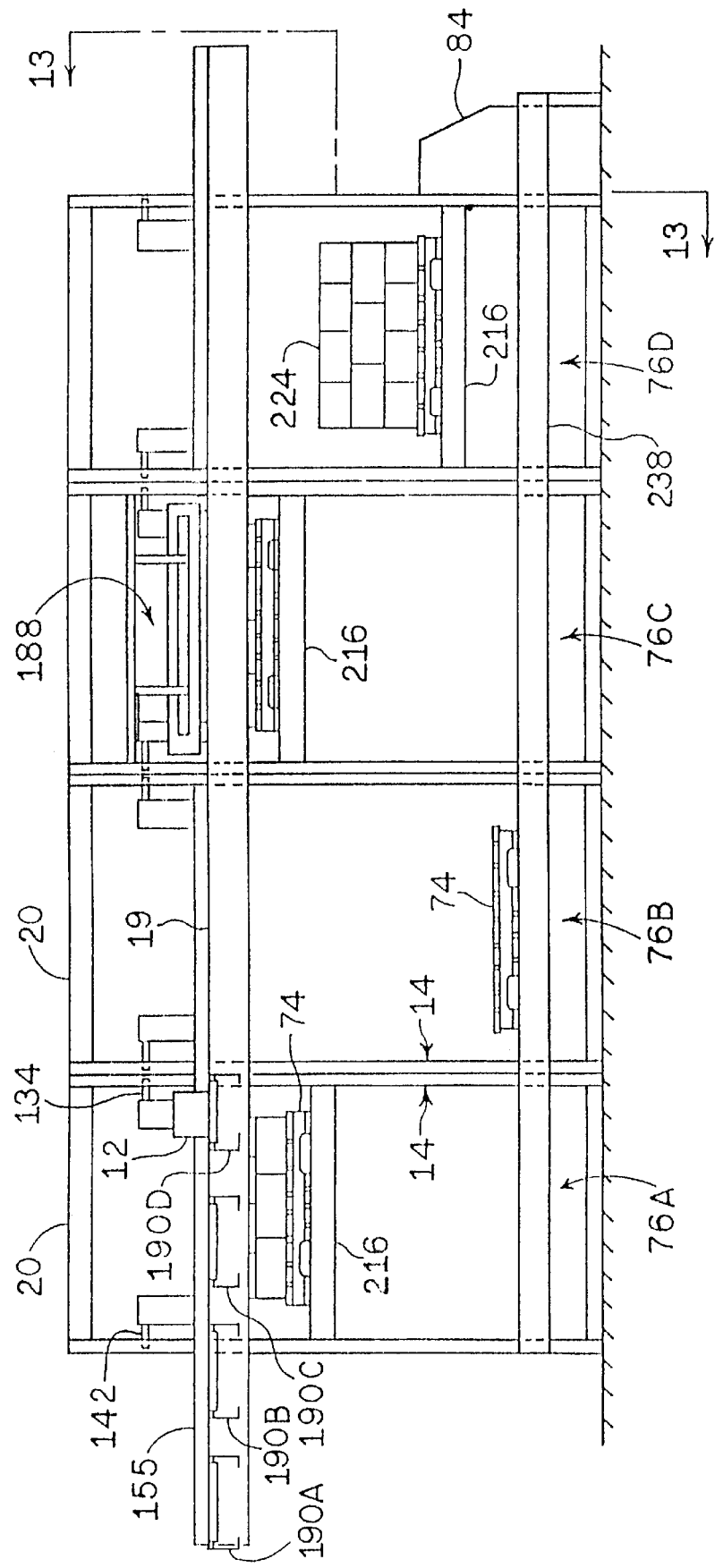
FIG. 12 shows a side elevation view of the palletizer of FIG. 11.

FIGS. 11–13 illustrate another embodiment of the invention which incorporates a layer holding station 188.

Turning now to FIG. 11, a plurality of product conveyors 190A, 190B, 190C, 190D are arranged to feed units of material 12 to their discharge ends 198; and from there onto and across in-feed conveyor 154. Each product conveyor includes a driven primary conveyor segment 192 and a driven speed-up conveyor segment 194, with a stop 196 disposed therebetween. Pop-up gravity wheel conveyors 200 are mounted into in-feed conveyor 154 adjacent each discharge end 198, and are oriented to guide units of material 12, discharged from the product conveyors, transversely across the in-feed conveyor 154 such that a row 202 of units of material 12, generally equal in length to the width of the layer to be formed, can be set up when the units of material are fed onto and across conveyor 154 at a discharge end 198. As illustrated in FIG. 11, the rows 202 are then advanced along the infeed conveyor 154 in the direction shown toward the layer forming station 162.

A sensor mechanism, such as an electric eye 204 and sensor 206 detects the presence of advancing units of material at the layer forming station 162 on in-feed conveyor 154 and causes the controller 84 to command interposing stop 208 between the advancing row 202 at layer forming station 162, and layer holding station 188.

Layer holding station 188 is positioned adjacent infeed conveyor 154, such that an advancing formed layer 90 of units of material is readily advanced from the layer forming station 162 into the layer holding station. Bridge plate 212 serves as a bridge between layer holding station 188 and transfer plate 70, and is generally at the same height as holding station 188 and transfer plate 70, such that a formed layer 90 in layer holding station 188 can be pushed by pusher 214 from layer holding station 188 across bridge plate 212 onto transfer plate 70.

Transfer plate 70, in the embodiment of FIGS. 11–13, is mounted to carriage 22 in generally the same manner as is transfer plate 70 in the earlier described embodiments (e.g. FIGS. 1–3), and operates in generally the same manner. Namely, transfer plate 70 positions a layer over the load, and then is withdrawn from under the load while end plates 134, 142 hold the layer in position over the load.

In this embodiment, however, carriage 22, which is otherwise the same as in the previous embodiments, is fixedly attached to the frame 14. The distance between the transfer plate 70 and the top of the load is adjusted by raising or lowering the respective load to correspond with the fixed height of the transfer plate 70, as described more fully hereinafter.

As seen in FIGS. 11 and 12, four load forming stations 76A, 76B, 76C, and 76D are illustrated. The load forming stations 76A, 76B, 76C, and 76D, respectively, are contiguous to each other in a single array. Each load forming station comprises a frame 14 having corner posts 18 and horizontal overhead members 20, and a chain lifted platform 216. The frame, lift and platform elements in FIGS. 11–13 are substantially the same as the corresponding elements in FIGS. 1–3, except that lift elements in FIGS. 11–13 lift the pallet or load on platform 216 rather than lifting the transfer plate 70 as in the embodiments of FIGS. 1–3. Accordingly, a pallet 74 can be placed on each or any platform 216, and a selected platform 216 can be raised and lowered as needed to position the top of its load adjacent the bottom of transfer plate 70.

Pallets 74 are fed into the palletizing system of FIGS. 11–13 on pallet in-feed conveyor 238. Conveyor 238 includes a conventional stop, and a set of pop-up gravity wheels adjacent each of the load forming stations 76A–76D. As an incoming pallet approaches the designated load forming station, the appropriate stop is raised and stops the advance of the pallet. The pop-up gravity wheels at that station then pop up, and convey the pallet onto the respective platform 216. Other conventional methods of placing pallets in the load forming stations will be obvious to those skilled in the art.

Referring again to FIGS. 11–13, a pallet 74 can be directed to each or any platform 216, and any platform can be raised and lowered as needed to position the top of its load adjacent the plane 226 in which the transfer plate moves. As selected, the transfer plate 70 can then transport a layer of material to a position directly over the respective load and deposit the layer on the load.

The operation of the palletizing apparatus of FIGS. 11–13 is as follows. Units of material 12 are selected by the controller 84 and advanced along one of product conveyors 190A–190D, e.g. 190A, along the primary driven conveyor segment 192 toward its discharge end 198. The respective stop 196 is in the retracted position. As each unit of material 12 passes from the primary conveyor segment 192 to speed-up conveyor segment 194, the distance between it and the next trailing unit is increased as a direct result of the speed up. Accordingly, when a unit 12 enters speed-up segment 194, there is created a space 195 of sufficient length that stop 196 can be interposed between the two units, whereby the advance of all trailing units can be stopped while the units which have advanced past stop 196 can continue their advance onto and across conveyor 154.

As the units 12 advance past retracted stop 196, a conventional unit counter, not shown, counts the units. Concurrently the respective pop-up gravity wheel conveyor 200 pops up such that its wheels are above the rollers on conveyor 154. The units of material 12 (cartons of product) are thus transported across conveyor 154 until the lead unit 12 encounters wall 155 at the far side of conveyor 154. When the desired number of units of material have been conveyed past stop 196, controller 84 issues a signal and stop 196 is interposed between the units 12 on the speed-up conveyor segment 194 and the trailing units on the primary conveyor segment 192. Accordingly, a row 202 of the desired number of units 12 can be formed on conveyor 154.

Pop up conveyor 200 drops down such that the units are lowered onto the rollers of conveyor 154. At this point, the units are arranged in a row 202 across conveyor 154. As conveyor 154 is driven, the row 202 is advanced toward the layer forming station 162 as shown in FIG. 11. The orientation of the row 202 is such that the units of material 12 are arranged side by side across conveyor 154, whereupon they advance along conveyor 154 in a line abreast as shown.

As the row 202 of units of material reaches layer forming station 162, it interrupts the circuit of electric eye 204 and sensor 206 whereupon stop 208 is interposed between conveyor 154 and holding station 188. The units 12 of row 202 abut stop 208 and are stopped, forming the first row of the layer.

Additional rows are formed on conveyor 154 in the same manner, and are similarly advanced to the layer forming station 162. The second and subsequent rows in a layer are stopped in the layer forming station 162 by abutment with the preceding row. Accordingly, a full layer 218 can be formed in the layer forming station.

When the required number of rows 202 of units 12 of product have been accumulated to thereby form a layer in the layer forming station, the formed layer 218 then advances to the layer holding station 188. Advancement to the layer holding station is effected by first ensuring that layer holding station 188 is ready to receive a layer. Accordingly, controller 84 senses the absence of a layer in the layer holding station by electric eyes 230 and respective sensors 232, and senses the retracted position of the pusher 14 by the activation of microswitch 234 by frame 236 of pusher 214.

With switch 234 activated, and sensors 230, 232 signalling no layer in layer holding station 188, stop 208 is retracted and infeed conveyor 154 and layer holding station conveyor 228 are driven, whereupon the layer 218 is advanced into the layer holding station and against extended stop 210. When the layer 218 is in the holding station, stop 208 is imposed between the layer forming station 162 and the layer holding station 188, so that another layer can begin forming in layer forming station 162.

Upon signal to controller 84 by appropriate microswitch or other means (not shown) that transfer plate 70 is in its layer receiving position as shown in FIG. 11, pusher 214 pushes the layer 218 across bridging plate 212 and onto transfer plate 70. Transfer plate 70 then is driven by driver 236 and moves over the selected load forming station 76A, 76B, 76C, or 76D. Concurrently, controller 84 confirms that the platform 216 at the respective load forming station is at the appropriate height to receive layer 218, and that a pallet is in place in the load forming station. A pallet is put in place if necessary. If the platform is not at the appropriate height, the controller issues appropriate control signals to bring the platform to the appropriate height. When the platform is at the appropriate height, such that the pallet or the top of the load is spaced a small distance under transfer plate 70, transfer plate 70 is withdrawn from under the layer 218, with at least one of end plates 134, 142 in the vertical position, namely that plate which is disposed in the direction of withdrawal of transfer plate 70. This allows the layer 218 to drop a short distance onto the underlying load, whereupon the layer 218 becomes part of the respective load.

Transfer plate 70 then moves back to the layer receiving station as shown in FIG. 11. Meantime, a second layer has been formed and is being held in layer holding station 188, and a third layer is being formed at layer forming station 162.

The forming of layers, and transferring the formed layers to the pallet loads, continues for as long as necessary to process the units of material 12 being delivered to the palletizer. When a given pallet loading has been completed, the pallet load 224 is returned to the level of pallet in-feed conveyor 238 and is discharged on the respective one of load exit conveyors 240.

Each of product conveyors 190A–190D typically receives product from a respective production line. Such an arrangement of multiple product conveyors and multiple layer forming stations is especially useful when no one product has sufficient volume of goods to justify an automated palletizing apparatus, but where the combined volume of the production lines does justify such automated equipment.

Accordingly, controller 84 is conveniently programmed to sequence the several products from the several product conveyors into and through the palletizing system, such that each unit of each product is placed onto the proper pallet load. Typically, each product conveyor 190A–190D conveys only one type of product, and each load forming station 76A–76D is identified by the controller to receive a given product, such that the load forming station receives product only from that one product conveyor to which it is linked. The result is that all units of material arriving at conveyor 154 on a given product conveyor will be placed on the pallet at the load forming station with which it is identified by the controller. For example, all units of material 12 which arrive at conveyor 154 on product conveyor 190D are placed on the load in load forming station 76D; all units of material 12 which arrive at conveyor 154 on product conveyor 190C are placed on the load in load forming station 76C; etc.

It is, of course, possible to instruct the controller whereby any units can be directed to, and placed on, the load at any selected load forming station. Where each product conveyor 190A–190D conveys a different product, whether different product content, different product size, or both, it is preferred to form each layer with product from only one product conveyor and its associated production source.

As soon as a given conveyor (e.g. 190A) has received a sufficient number of units of material, from its production source, to form a full layer, a sensor (not shown) on the respective conveyor signals, to the controller, that the respective conveyor is ready to discharge enough units of material to form a full layer. As soon as the controller receives the conveyor ready signal, the respective product conveyor can be selected by the controller to feed enough of its units of material to form a full layer onto conveyor 154 in discreet rows, whereupon the rows can be advanced along conveyor 154 and formed into a layer which is subsequently placed on the selected pallet load 224. Accordingly, in typical sequencing, the controller selects the product conveyor from which units of material are to be released, and the load station to which they are to be delivered. The controller then signals the retraction of the respective stop 196 and corresponding release of units of material 12 from the selected product conveyor in incremental numbers of the units of material sequenced by rows, such that each release of units of material from any given product conveyor contains the number of units of material to be used to form a full layer of the respective units of material. Each such incremental release is fed onto conveyor 154 and fed by conveyor 154 to the layer forming station 162, where a layer is formed. The formed layer is then fed to the selected load forming station, and placed on its load.

After each incremental release of enough units of material to form a layer, the controller 84 can select the same or a different set, of product conveyor and load forming station for release, and receipt, of the units of material to be used to form the next layer. The units of material 12 on a given product conveyor 190A–190D can have dimensions different from the dimensions of the units of material on one or more others of the product conveyors 190A–190D. Accordingly, the layers formed with material from a given one of product conveyors 190A–190D can define a layer configuration which differs from the layer configuration defined by any one or more of the other product conveyors. Namely, the number of rows and the number of units per row, in a layer made with material from conveyor 190A, can be different from the number of rows and/or the number of units per row in a layer made with material from one or more of conveyors 190B, 190C, and 190D. Thus, where a plurality of layers or layer precursors are being processed simultaneously at different stations, the several layers may all be the same, or may have units of different size, or may have different numbers of rows and/or different numbers of units per row. Typically, however, all the layers produced with units of material from a given one of product conveyors 190A–190D, will be uniform in terms of size of units of material, number of units per row, and number of rows per layer.

Controller 84 preferably constantly monitors layer holding station 188 for its readiness to receive a layer. In those cases where layer holding station 188 is ready to receive a layer before a layer is formed in the layer forming station 162, stop 208 is retracted whereupon the advancing rows on conveyor 154 advance directly into layer holding station 188, and the layer is formed in layer holding station 188.

Figure 11A:
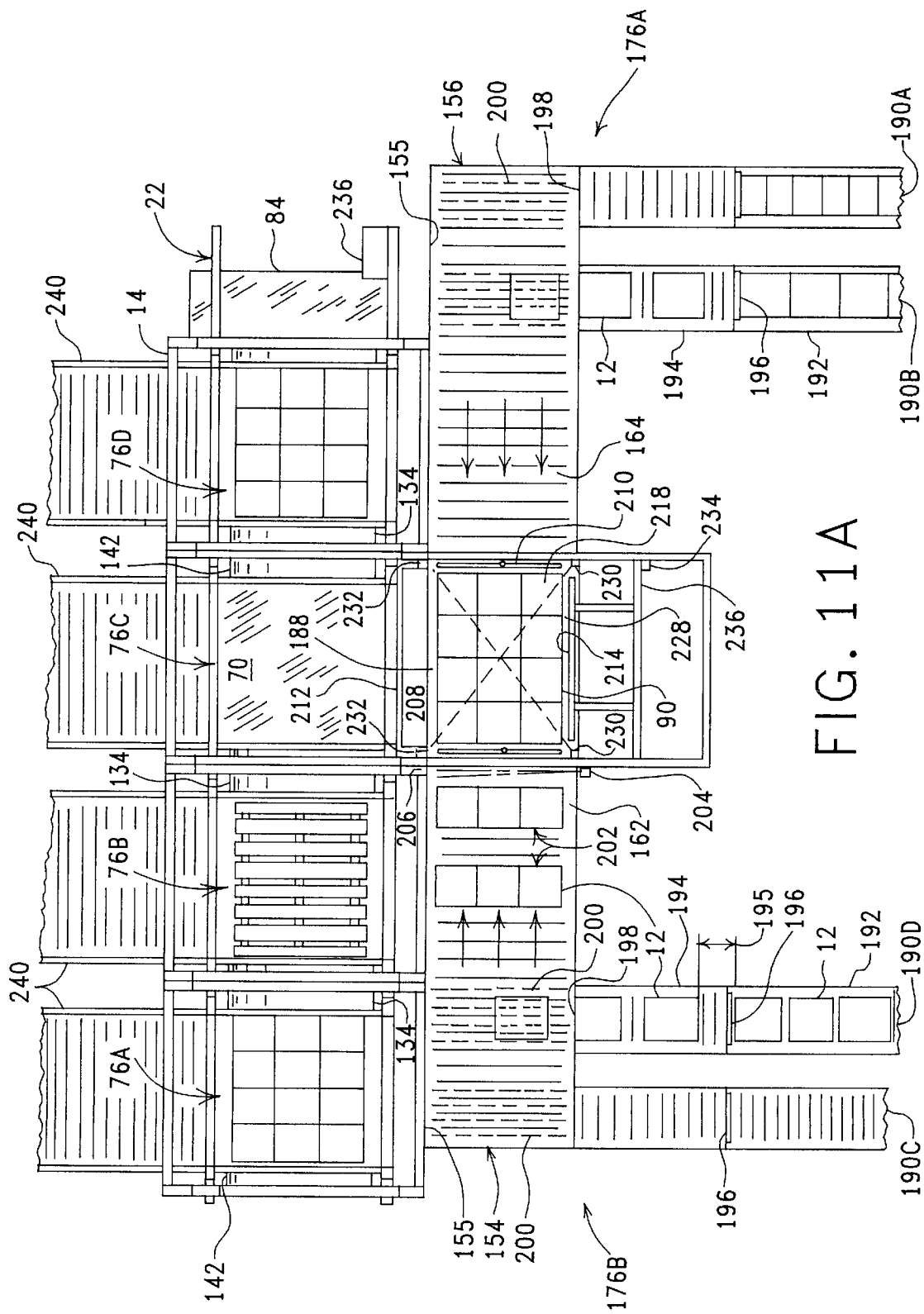

FIG. 11A illustrates a palletizer similar to that shown in FIG. 11, but wherein the product conveyors are positioned on opposing sides of the layer holding station 188 and feed two layer forming stations 162, 164 on opposing sides of layer holding station 188, using respective in-feed conveyors 154, 156.

Specifically, product conveyors 190A, 190B feed units of material to in-feed conveyor 156. In-feed conveyor 156 feeds its formed rows, in the direction shown by the arrows, to layer forming station 164, which is an integral part of the end portion of conveyor 156. The rows are formed into layers in layer forming station 164, as described above with respect to FIG. 11. Product conveyors 190C, 190D feed units of material to in-feed conveyor 154. In-feed conveyor 154 feeds its formed rows, in the direction shown by the arrows, to layer forming station 162. The rows are formed into layers in layer forming station 162.

The embodiment of FIG. 11A comprises two in-feed subsystems 176A and 176B, each, as shown, being a mirror image of the other. Namely, each in-feed subsystem comprises two product conveyors, an in-feed conveyor, and a layer forming station. The elements of each of in-feed subsystems operate in essentially the same manner as the respective elements in the embodiment of FIG. 11. As illustrated in the previous embodiments which teach plural layer forming stations, the embodiment of FIG. 11A can be forming two layers at the same time in its two layer forming stations. And layer holding station 188 receives layers from both layer forming stations 162, 164. Accordingly, conveyor 228 in layer holding station 188 is equipped with a two-way drive in order to advance the formed layers from the layer forming stations 162, 164 into the layer holding station. The steps used to advance the formed layers into the layer holding station in this embodiment are the same as the steps used to advance layers into the layer holding station in the embodiment of FIG. 11, modified, of course, to accommodate the opposite direction of advance when a layer is advanced from layer forming station 164. From layer holding station 188, the physical movement of a formed layer is the same as in the embodiment of FIG. 11. Thus the paths 242A and 242B traversed by the layers, as they move from the layer forming stations 162 and 164 to the load support apparatus, converge at layer holding station 188.

An advantage of the embodiment of FIG. 11A is that two layers can be forming at the same time, e.g. in the respective layer forming stations 162,164. Accordingly, it is not necessary to finish the feeding of a first layer set of units of material (enough units of material to make a layer) from a first product conveyor onto the in-feed conveyor before beginning the feeding of a second layer set from a second product conveyor, so long as the first and second layer sets are fed onto different in-feed conveyors, as is shown in FIG. 11A. It is still necessary, though, that the controller select the load station to which each layer set is directed and delivered after being formed into a layer.

The number of product conveyors feeding into each of the in-feed conveyors is not critical and can be varied at will. Likewise, the number of product conveyors feeding the two in-feed conveyors need not be the same. Indeed, in-feed conveyor 154 could be fed by one product conveyor and infeed conveyor 156 fed by three product conveyors, or vice versa. Also, while it is preferred that the number of load forming stations be the same as the number of product conveyors, there is no requirement for such, whereby the number of product conveyors can be more, or less, than the number of load forming stations.

While the invention has been described with respect to placing units of material onto pallets, other types of supporting surfaces, such as tables, plates, and the like can be used for building loads thereon. Accordingly, wherever in this teaching, or in the claims to follow, the word "pallet" is used, it is to include all such other supporting surfaces within the meaning thereof.

Those skilled in the art will now see that certain modifications can be made to the palletizers and palletizing systems herein disclosed with respect to the preferred and illustrated embodiments, without departing from the spirit of the instant invention. And while the invention has been described above with respect to the preferred embodiments, it will be understood that the invention is adaptable to numerous rearrangements, modifications, and alterations, and all such arrangements, modifications and alterations are intended to be within the scope of the appended claims.

Having thus described the invention, what is claimed is:

1. Palletizing apparatus, said palletizing apparatus being adapted to receive units of material, to arrange the units of material in arrangements comprising layers of one or more loads to be built, and to transfer the layers to respective one or more pallets, said palletizing apparatus comprising:

(a) load support apparatus adapted to receive delivery of, and to support, a pallet, and to receive delivery of, and to support, one or more layers of material on the pallet when the pallet is positioned at said load support apparatus whereby loads are formed on the pallet;

(b) an accumulator on said palletizing apparatus, said accumulator receiving units of material and arranging said units of material into layers to be transported to said load support apparatus, said accumulator further receiving and arranging said units of material and forming a first such layer, and concurrently receiving and arranging units of material and forming at least a second such layer; and (c) transfer apparatus including a transfer plate, said transfer apparatus being adapted to utilize said transfer plate to receive material from said accumulator and to transfer the material to said load support apparatus.

2. Palletizing apparatus as in claim 1, said accumulator comprising first and second layer forming stations, said transfer apparatus being adapted to receive material from said first and second layer forming stations.

3. Palletizing apparatus as in claim 2 wherein said transfer apparatus is adapted to be positioned in a first location while receiving material thereonto from said first layer forming station, and is adapted to be positioned in a second location, different from said first location, while receiving material thereonto from said second layer forming station.

4. Palletizing apparatus as in claim 3 wherein said transfer apparatus is adapted to be positioned in a third location, different from said first and second locations, while delivering material to said load support apparatus.

5. Palletizing apparatus as in claim 2 wherein said palletizing apparatus is adapted for disposition of said transfer apparatus in a first location when receiving material from one of said first and second layer forming stations, and for movement of said transfer apparatus to a second location when delivering the material to the respective pallet, and wherein material can be received from either of said first and second layer forming stations onto said transfer apparatus separately when said transfer apparatus is in said first location.

6. Palletizing apparatus as in claim 2, said load support apparatus comprising first and second load forming stations, apparatus for positioning said transfer means separately adjacent a selected one of said first and second load forming stations, and means for transferring a layer of material from said transfer apparatus to a pallet on said selected one of said first and second load forming stations.

7. Palletizing apparatus as in claim 2, said palletizing apparatus being adapted to simultaneously process components of at least three separate layers at respective ones of said first and second layer forming stations and said transfer apparatus.

8. Palletizing apparatus as in claim 1, said load support apparatus comprising first and second load forming stations, apparatus for positioning said transfer means separately adjacent a selected one of said first and second load forming stations, and means for transferring a layer of material from said transfer apparatus to a pallet on said selected one of said first and second load forming stations.

9. Palletizing apparatus, comprising:
  (a) a layer forming station for forming a layer of units of material;
  (b) a load support apparatus adapted to receive delivery of, and support a plurality of, pallets at a plurality of load forming stations, and to receive delivery of and support formed layers of units of material to be deposited on the pallets, whereby the layers of units of material are used to form loads of material on the pallets, said load support apparatus being adapted to receive delivery of, and to support, first and second pallets in an arrangement wherein the second pallet is in a plane above the first pallet, with sufficient vertical spacing between the pallets that a formed layer used to form a load of material on a pallet can be placed on either pallet at relatively different vertical positions dependent upon the pallet then having the layer deposited thereon without interference from the other pallet, and without moving either pallet; and
  (c) a transfer apparatus, said transfer apparatus being adapted to receive material from said layer forming station, to move, with said material, to one of more than one of said load forming stations, and to transfer the material from said transfer apparatus to the pallet at said one load forming station,
  whereby said transfer apparatus can deliver units of material to a plurality of pallets without laterally moving the pallets and any partial loads thereon.

10. Palletizing apparatus, comprising:
  (a) a layer forming station for forming a layer of units of material;
  (b) a load support means, said load support means comprising a plurality of load forming stations, each said load forming station comprising means to support a pallet and a load thereon; and
  (c) a transfer means, said transfer means comprising (i) a support carriage, (ii) a transfer plate mounted on said carriage to receive the units of material on top of said transfer plate, (iii) means to move said transfer plate, along said carriage, from a layer receiving station to a location proximate any one of said load forming stations, and (iv) layer restraining means proximate each said load forming station, said layer restraining means being adapted to restrain a layer against substantial horizontal movement thereof while said transfer plate is withdrawn from under said layer.

11. Palletizing apparatus as in claim 10 wherein said palletizing apparatus comprises a second layer forming station, said transfer means being adapted to receive material from said first and second layer forming stations.

12. Palletizing apparatus as in claim 11, said apparatus is adapted to dispose said transfer plate at a first location when receiving material from one of said first and second layer forming stations, and to dispose said transfer plate at a second location when delivering the material to the respective one of said load forming stations, and wherein material can be received from either of said first and second layer forming stations onto said transfer plate when said transfer plate is in said first location.

13. Palletizing apparatus as in claim 11 wherein said transfer plate is adapted to be positioned in a first location while receiving material thereonto from said first layer forming station, and is adapted to be positioned in a second location, different from said first location, while receiving material thereonto from said second layer forming station.

14. Palletizing apparatus as in claim 11, said palletizing apparatus being adapted to simultaneously process components of at least three separate layers at respective ones of said first and second layer forming stations and said transfer plate.

15. Palletizing apparatus as in claim 10, said load support means comprising a pallet elevator at each said load forming station, and said transfer means carriage being secured in said apparatus against vertical movement of said carriage.

16. Palletizing apparatus, comprising:
  (a) a layer forming station for forming layers of units of materials for deposition thereof on a transportable load carrier;
  (b) a layer holding station, separate from said layer forming station, for receiving and temporarily holding a layer formed at said layer forming station; and
  (c) a transfer plate adapted to receive a layer from said layer holding station, to move, with the layer, to a load forming station, and to transfer the layer to a pallet load at said load forming station.

17. Palletizing apparatus as in claim 16, said apparatus being adapted to advance all of said units of material which traverse said apparatus, from said layer forming station to said transfer plate, through said layer holding station, all said units of material having been incorporated into one said layer before any said units are placed on said transfer plate.

18. Palletizing apparatus as in claim 16 wherein said palletizing apparatus comprises a second layer forming station, said layer holding station being adapted to receive material from said first and second layer forming stations.

19. Palletizing apparatus as in claim 16, said apparatus being adapted to simultaneously processing components of at least three separate layers at respective ones of said layer forming station, said layer holding station and said transfer plate.

* * * * *